(12) United States Patent
Jankowsky, III et al.

(10) Patent No.: US 11,060,778 B2
(45) Date of Patent: Jul. 13, 2021

(54) UNIVERSAL CONTROLLER FOR INTEGRATION OF CRYOGENIC EQUIPMENT, REQUIRING DIFFERENT CONTROL MECHANISMS, ONTO A SINGLE OPERATING PLATFORM

(71) Applicant: SUMITOMO (SHI) CRYOGENICS OF AMERICA, INC., Allentown, PA (US)

(72) Inventors: Frank P. Jankowsky, III, Montrose, CO (US); Craig Hollabaugh, Montrose, CO (US); Gary S. Ash, Dartmouth, MA (US)

(73) Assignee: SUMITOMO (SHI) CRYOGENIC OF AMERICA, INC., Allentown, PA (US)

( * ) Notice: Subject to any disclaimer, the term of this patent is extended or adjusted under 35 U.S.C. 154(b) by 0 days.

(21) Appl. No.: 16/760,011

(22) PCT Filed: Oct. 29, 2018

(86) PCT No.: PCT/US2018/058005
§ 371 (c)(1),
(2) Date: Apr. 28, 2020

(87) PCT Pub. No.: WO2019/084545
PCT Pub. Date: May 2, 2019

(65) Prior Publication Data
US 2020/0348063 A1 Nov. 5, 2020

Related U.S. Application Data

(60) Provisional application No. 62/578,498, filed on Oct. 29, 2017, provisional application No. 62/638,672, filed on Mar. 5, 2018.

(51) Int. Cl.
*F25B 49/02* (2006.01)
*H04L 29/06* (2006.01)
*H04Q 9/00* (2006.01)

(52) U.S. Cl.
CPC ............ *F25B 49/022* (2013.01); *H04L 69/08* (2013.01); *H04Q 9/00* (2013.01); *F25B 49/025* (2013.01); *H04Q 2209/10* (2013.01)

(58) Field of Classification Search
CPC ...... F25B 49/022; F25B 49/025; H04L 69/08; H04Q 9/00; H04Q 2209/00;
(Continued)

(56) References Cited

U.S. PATENT DOCUMENTS

| 5,497,450 A | 3/1996 | Helmbold et al. |
| 6,272,400 B1 * | 8/2001 | Jankins ............. G05B 19/4185 700/282 |

(Continued)

FOREIGN PATENT DOCUMENTS

CN 104468593 A 3/2015

OTHER PUBLICATIONS

International Search Report and Written Opinion dated Feb. 21, 2019, from International Application No. PCT/US2018/058005, 10 sheets.

(Continued)

*Primary Examiner* — Franklin D Balseca
(74) *Attorney, Agent, or Firm* — Katten Muchin Rosenma LLP

(57) ABSTRACT

A universal controller for integration of cryogenic equipment, requiring different control mechanisms, onto a single operating platform. The universal controller may include a power supply element that is configured to simultaneously drive a plurality PV of cryogenic devices that have different power supply requirements and a protocol translator element
(Continued)

that is configured to enable communication between a plurality' of cryogenic devices that use different, incompatible communication protocols, wherein the protocol translator element translates communications sent by a first type of cryogenic device from a first cryogenic device communication protocol into a second cryogenic device communication protocol and translates communications sent by a second type of cryogenic device from a second cryogenic device communication protocol into the first cryogenic device communication protocol, enabling the first type of cryogenic device and the second type of cryogenic device to communicate with each other.

26 Claims, 28 Drawing Sheets

(58) Field of Classification Search
CPC .......... H04Q 2209/10; H04Q 2209/30; H04Q 2209/40; H04Q 2209/70
See application file for complete search history.

(56) References Cited

U.S. PATENT DOCUMENTS

| | | |
|---|---|---|
| 9,496,691 B2 | 11/2016 | Westrick, Jr. et al. |
| 2006/0056450 A1 | 3/2006 | Chalopin et al. |
| 2008/0013569 A1 | 1/2008 | Boren |
| 2013/0160468 A1* | 6/2013 | Kimura ............... F25B 9/14 62/6 |
| 2014/0312798 A1 | 10/2014 | Westrick, Jr. et al. |

OTHER PUBLICATIONS

Chinese Office Action dated Mar. 25, 2021, for the Corresponding Chinese Patent Application No. 201880070400.6.
Korean Office Action dated Apr. 28, 2021, for the Corresponding Chinese Patent Application No. 10-2020-7014181.

* cited by examiner

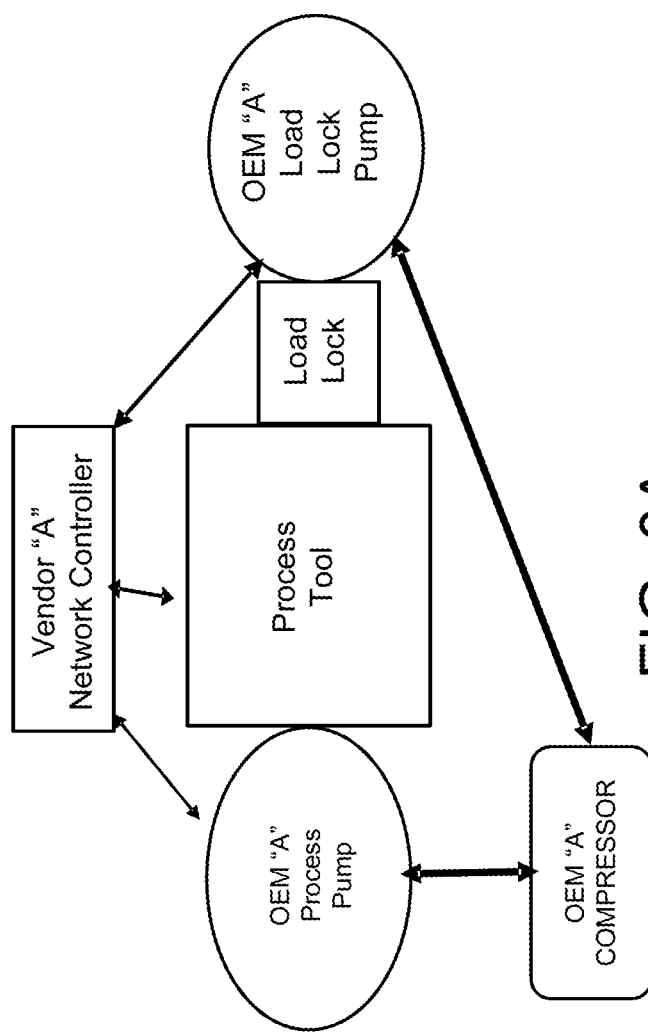

| Speed (L/Sec) | OEM "A" Process Pump |
|---|---|
| H² O | 9,000 |
| Air | 3,000 |
| H | 5,000 |
| AR | 2,500 |
| Capacity (Std. L) | |
| AR | 2,000 |
| H | 24 |
| Cooldown (Min) | 150 |

FIG. 8B

| Speed (L/Sec) | OEM "B" |
|---|---|
| $H^2O$ | 9,500 |
| Air | 3,600 |
| H | 7,300 |
| AR | 3,100 |
| Capacity (Std. L) | |
| AR | 2,000 |
| H | 50 |
| Cooldown (Min) | 90 |

FIG. 8D

UNIVERSAL CONTROLLER FOR INTEGRATION OF CRYOGENIC EQUIPMENT, REQUIRING DIFFERENT CONTROL MECHANISMS, ONTO A SINGLE OPERATING PLATFORM

CROSS REFERENCE TO RELATED APPLICATIONS

This application is the National Stage of International Application No. PCT/US2018/058005, filed on Oct. 29, 2018, which claims priority of U.S. Provisional Application No. 62/578,498, filed on Oct. 29, 2017, and U.S. Provisional Application No. 62/638,672, filed on Mar. 5, 2018, which are hereby incorporated herein by references in its entirety.

RELATED APPLICATIONS

This application claims the priority of U.S. Provisional Application No. 62/578,498, entitled "Universal Controller for a Cryogas Compressor for Simultaneously Driving Different Types of Cyrogenic Pumps," and filed Oct. 29, 2017 and U.S. Provisional Application No. 62/638,672, entitled "Protocol Translator for Compressor for Simultaneous Use in Multiple Different Types of Cryogenic Pumps," and filed Mar. 5, 2018, both of which are incorporated by reference in their entirety.

BACKGROUND

1. Field

The invention is generally directed to cryogenic systems and more particularly to cryogenic systems including controllers, cryopumps, and cryogenic devices

2. Discussion of the Related Art

A "cryopump" is a pump that is used in a cryogenic refrigeration system to achieve or maintain cryogenic temperatures, generally accepted to be −150° C. (123.15 K; −238.00° F.) or colder. A "cryogas compressor" powers the cryopump to pump one or more "cryogases," i.e., a gas for cryogenic use, e.g., helium, to place or maintain other components of the cryogenic refrigeration system at cryogenic temperatures.

The most common cryogenic refrigeration systems are used in commercial applications and have input power of up to about 10 kW and operate on the GM (Gifford-McMahon) cycle. GM refrigeration systems are characterized by having a compressor that is: 1) separate from the expander, 2) has supply and return gas lines between the compressor and the expander, and 3) has one or more electrical lines between the compressor and expander to provide power and communication between the compressor and the expander.

Furthermore, when installed on a process tool that has a central controller, the cryopump may have additional communication lines connected to a network controller, or to the process tool controller directly, that enables communication of the cryopump's status to the process tool.

The cryogas compressor receives power from an external source and typically has an electrical enclosure with components that supply power to the compressor motor, expander motor, sensors, solenoids, heaters, etc.

The most common cryopumps have two-stage expanders that cool cryopanels at temperatures below 20K and 80K. At these temperatures, the components of air and other gases are frozen or adsorbed such that very "clean" high vacuum environments are created which are widely used in semiconductor manufacturing, coating applications and R&D.

Generally, each manufacturer of cryopumps and/or cryogas compressors uses; (1) a power supply and/or controller regimen that is proprietary to their system to power the cryopump and, when required, (2) a proprietary communication protocol (I/O) to enable the cryopump to communicate to a process tool controller directly or via a network controller.

There does not exist a common platform (i.e., "control system") onboard, or in combination with a specific manufacturer's cryopump or cryogas compressor, that enables it to; (1) operate the motor of a cryopump from a different manufacturer which uses a different control system, nor; (2) does there exist a common communication protocol (I/O) that enables different manufacturer's cryopumps, using different communication protocols, to communicate to a process tool controller either directly, or via a network controller, of a given manufacturer. In this application, "control system" and communication protocol means at least input/output (I/O) control, feedback, and supply capabilities association one or more of the electrical supply systems, communication systems, and/or cryogas supply systems associated with a cryopump and or cryogas compressor and related process tool controllers and networks.

Each manufacturer of a cryopump uses its own proprietary control and power supply system built into the cryopump and/or the cryogas compressor to power the motor in the cryopump. Consequently, it is difficult to impossible to acceptably interchange or mix cryopumps and/or cryogas compressors made by different manufacturers using different electrical power supply designs and communications protocols, on the same application and have them operate properly. This is especially true when a Process Tool using cryopumps requires the cryopumps to communicate to its process control system directly or via a network controller.

When the control system between a cryogas compressor and a cryopump cannot be operated properly per each manufacturers' specifications for voltage, phasing and I/O inputs to the cryopump, the motor powering the expander in the cryopump will not move and the cryopump will not produce cryogenic temperatures within the design parameters set by the manufacturer of the cryopump. On large process tool, multi compressor—multi cryopump applications, the attempt to interchange or mix multiple manufacturers' equipment introduces additional communications I/O and cryogas supply pressure management issues which contribute additional operational incompatibilities depending on the specifics of each manufacturer's design platform for power supply to the cryopump expander and communication protocols between the cryopumps and the network controller or the process tool controller.

This lack of interchangeability constrains users of cryopumps and cryogas compressors to specific cryopumps and cryogas compressors of a single manufacturer, and the users are thereby limited on available new technology, improved performance, improved pricing, competitive advantage, supply and support that may be available from a manufacturer other than the one they are currently using, but who's equipment operates on a differently designed electrical, communication, or gas supply platform.

SUMMARY

Embodiments described herein overcome the disadvantages of the prior art described above. Embodiments described herein are comprised of two components: a highly configurable Power Supply Element (PSE), and a Protocol Translator Element (PTE). Each component may be used separately or in combination with each other to provide the desired operating capability and equipment interchangeability desired by the End User.

These and other advantages may be provided by a universal controller configured to drive and communicate with a plurality of cryogenic devices, in a cryogenic system, that have different power supply requirements and use different communication protocols. The universal controller may include a power source that provides an input voltage that has a single phase and frequency, a power supply element, connected to the power source, that is configured to simultaneously drive a plurality of cryogenic devices that have different power supply requirements and a protocol translator element, connected to the power source, that is configured to enable communication between a plurality of cryogenic devices that use different, incompatible communication protocols. The power supply element may include a plurality of power supply outputs each with a phase, the power supply outputs including a first power supply output that provides a first output voltage at a first phase to a first type of cryogenic device that has first power requirements and a second power supply output that provides a second output voltage at a second phase to a second type of cryogenic device that has second power requirements, in that the second output voltage is different than the first output voltage, the second phase is different than the first phase, and the second power supply requirements are different than the first power supply requirements. The protocol translator element may include a plurality of communication input/outputs that receive and transmit cryogenic device communications in a plurality of protocols and a processor, communicatively connected to the plurality of communication input/outputs, that receives, translates, and outputs cryogenic device communications into different, compatible communication protocols, in that the processor is configured to receive and transmit communications from and to the first type of cryogenic device, in that the communications from and to the first type of cryogenic device are in a first cryogenic device communication protocol and receive and transmit communications from and to the second type of cryogenic device, in that the communications from and to the second type of cryogenic device are in a second cryogenic device communication protocol that is different from the first cryogenic device communication protocol. The processor translates communications sent by the first type of cryogenic device from the first cryogenic device communication protocol into the second cryogenic device communication protocol and translates communications sent by the second type of cryogenic device from the second cryogenic device communication protocol into the first cryogenic device communication protocol, enabling the first type of cryogenic device and the second type of cryogenic device to communicate with each other. In some embodiments wherein the second power supply requirements are the same as the first power supply requirements, even though the first and second cryogenic communication protocols are different. Likewise, in some embodiments, the first and second cryogenic communication protocols are the same even though the second power supply requirements are different than the first power supply requirements. Additionally, in some embodiments, the second output voltage is different than the first output voltage, although the second phase and the first phase are the same. In some embodiments the second phase is different than the first phase even though the second output voltage is the same as the first output voltage.

These and other advantages may also be provided by a method of driving and communicating with a plurality of cryogenic devices, in a cryogenic system, that have different power supply requirements and use different communication protocols. The method receives an input voltage, in that the single input voltage has a single phase and frequency and simultaneously drives a plurality of cryogenic devices that have different power supply requirements, in that the driving includes outputting a first output voltage at a first phase to a first type of cryogenic device that has first power supply requirements and outputting a second output voltage at a second phase to a second type of cryogenic device that has second power supply requirements, in that the second output voltage is different than the first output voltage, the second phase is different than the first phase, and the second power supply requirements are different than first power supply requirements. The method also enables communication between a plurality of cryogenic devices that use different, incompatible communication protocols by receiving communications from the first type of cryogenic device, in that the communications from the first type of cryogenic device are in a first cryogenic device communication protocol and receiving communications from the second type of cryogenic device, in that the communications from the second type of cryogenic device are in a second cryogenic device communication protocol that is different from the first cryogenic device communication protocol, translating communications received from the first type of cryogenic device from the first cryogenic device communication protocol into the second cryogenic device communication protocol, and transmitting the translated communications received from the first type of cryogenic device to the second type of cryogenic device, in that the translated communications from the first type of cryogenic device are in the second cryogenic device communications protocol.

Additionally, these and other advantages may be provided by an apparatus configured to drive with a plurality of cryogenic devices, in a cryogenic system, that have different power supply requirements. The apparatus includes a power source that provides a single input voltage that has a single phase and frequency and a power supply element, connected to the power source, that is configured to simultaneously drive a plurality of cryogenic devices that have different power supply requirements. The power supply element may include a plurality of power supply outputs each with a phase, the power supply outputs including a first power supply output that provides a first output voltage at a first phase to a first type of cryogenic device that has first power supply requirements and a second power supply output that provides a second output voltage at a second phase to a second type of cryogenic device that has second power supply requirements, in that the second output voltage is different than the first output voltage, the second phase is different than the first phase, and the second power supply requirements are different than the first power supply requirements.

Moreover, these and other advantages may be provided by universal controller configured to communicate with a plurality of cryogenic devices, in a cryogenic system, that use different communication protocols. The universal controller includes a power source that provides a single input voltage that has a single phase and frequency and a protocol translator element, connected to the power source, that is configured to enable communication between a plurality of cryogenic devices that use different, incompatible communication protocols. The protocol translator element may include a plurality of communication input/outputs that receive and transmit cryogenic device communications in a plurality of protocols and a processor, communicatively connected to the plurality of communication input/outputs, that receives, translates, and transmits cryogenic device communications into different, compatible communication protocols. The processor may be configured to receive and transmit communications from and to a first type of cryogenic device, in that the communications from and to the first type of cryogenic device are in a first cryogenic device communication protocol and receive and transmit communications from and to a second type of cryogenic device, in that the communications from and to the second type of cryogenic device are in a second cryogenic device communication protocol that is different from the first cryogenic device communication protocol, in that the processor translates communications sent by the first type of cryogenic device from the first cryogenic device communication protocol into the second cryogenic device communication protocol and translates communications sent by the second type of cryogenic device from the second cryogenic device communication protocol into the first cryogenic device communication protocol, enabling the first type of cryogenic device and the second type of cryogenic device to communicate with each other.

BRIEF DESCRIPTION OF THE DRAWINGS

The embodiments of the invention may be understood in regard to the following drawings.

FIG. 8A is a block diagram showing Vendor A's cryopump which is inadequate to the Process in regard to hydrogen carrying capacity and cool-down time and a Load Lock cryopump that is adequate in its performance.

FIG. 8B is a table illustrating the performance of the Vendor A cryopump illustrated in FIG. 8A.

FIG. 8D is a table illustrating the performance of the Vendor B cryopump illustrated in FIG. 8C.

DETAILED DESCRIPTION

Figure 1A:
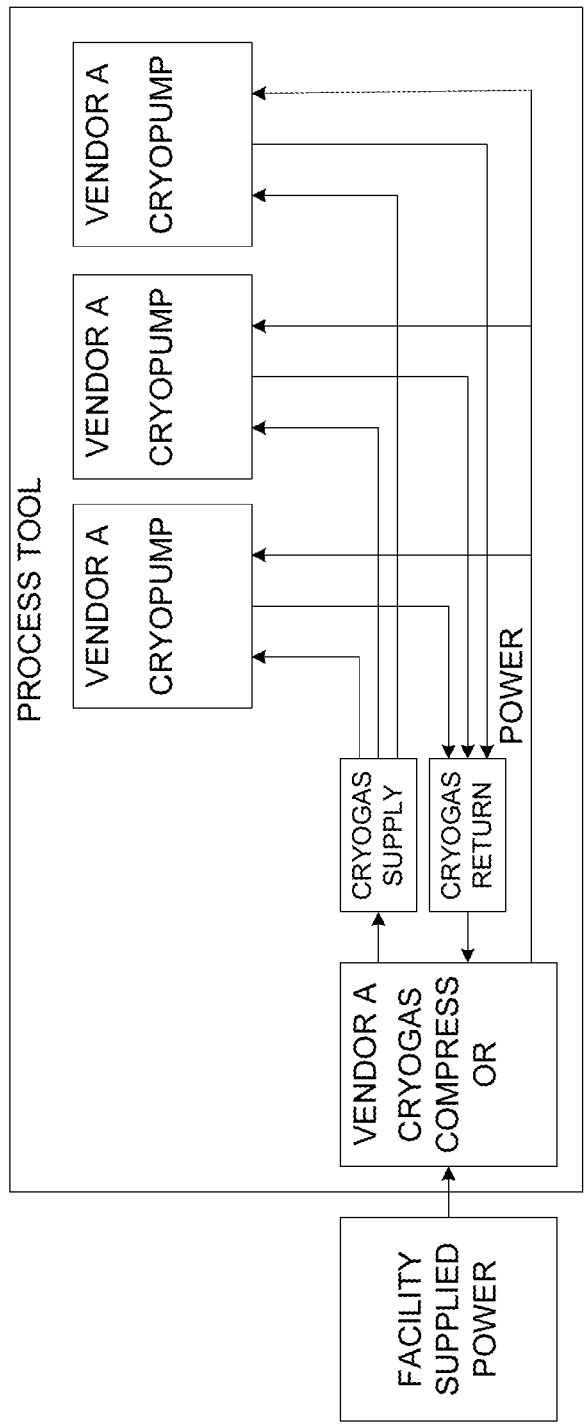
FIG. 1A is a schematic diagram of a high-level overview of a typical single manufacturer (A) sourced cryogenic installation on a process tool showing facility power and connections between major components when the process tool does not have a control system or network integrating the cryopumps I/O to the Process Tool's control system.

Embodiments are directed to a Universal Controller, comprised of two (2) components, a Protocol Translator Element and a highly configurable Power Supply Element, which when integrated into a cryogenic system, either jointly or separately, provide one or more of the following functions:

The Power Supply Element (PSE) simultaneously powering one or more cryogenic devices, such as cryogenic pumps, expanders, coolers, compressors, and other cryogenic devices, where each device may have the same or different electrical input requirements.

The Protocol Translator Element (PTE) enabling communications protocol translation between a cryopump and system network controller, or directly to a process tool controller, in which the cryopump and the network or tool controller are based on different communication protocols. (I/O)

The PSE and the PTE together powering and controlling multiple cryogenic pumps requiring differing voltage, phasing and communication protocols required to integrate them into a process tool cryogenic system by providing protocol translation with a network controller and or a process tool controller.

In particular, embodiments are directed to a highly configurable Power Supply Element for a helium compressor that can input power to one or more cryogenic expanders that are used to cool cryopumps, MRI magnets, and other cryogenic devices; and a I/O Protocol Translator which enables the communication of cryopump and cryogenic devices, where each may use different I/O protocols, so they may be integrated onto a single operating platform via a common network controller or directly to a process tool controller.

Embodiments of the Universal Controller's Power Supply Element (PSE) are comprised of electrical and communication components supplied to a host cryogas compressor, operating preferably on helium, that enables the host cryogas compressor to operate, singularly or simultaneously, the cryopumps of multiple cryopump manufacturers either in a singular group by manufacturer, or while combining the cryopumps of several manufacturers on the same application.

Advantageously, the PSE permits the removal of another manufacturer's cryogas compressor from a cryogenic refrigeration system and the installation of a preferred host cryogas compressor incorporating the PSE. Therein, the preferred substitute host cryogas compressor can bring the advantage of being more efficient, more easily maintained, more reliable, or being larger sized so that multiple cryopumps are driven by the compressor, even though the cryopumps are from different manufacturers with different control systems requiring different voltages, phasing and I/O.

The advantages of the present invention may be illustrated in the following example. A major cryogenic systems manufacturer supports predominantly semiconductor manufacturing, and a minor cryogenic systems manufacturer supports predominantly research labs and small coating firms. The two manufacturers' equipment are not interchangeable due to differing control and I/O requirements. However, the PSE enables the interchangeability of these two manufacturers' products, and can also add a third major manufacturers' products whose products predominantly support magnetic resonance imaging. That is, the present invention permits a user to operate different cryopumps, each of which has a different control system requiring different voltages, phasing and I/O.

The Universal Controller PSE provides the necessary electrical hardware to modify the voltage, phasing and current needed to drive multiple different electrical design requirements for multiple different cryopump manufacturers. The invention can simultaneously drive all of the same manufacturer's cryopumps, or a combination of different manufacturer's cryopumps on the same application at the same time. The capabilities of the PSE also enable the removal of a manufacture's cryogas compressor, which may be at end of life, obsolete, inefficient etc., and the installation of the invention on a new PSE host cryogas compressor to drive all of the other manufacturer's cryopumps, hence providing the user with an alternative cryogas compressor source. This new host compressor using the PSE can drive cryopumps of the same manufacturer's design or a combination of multiple manufacturer's designs. Other compressors cannot drive multiple cryopumps of multiple manufacturers which require different cryopump motor voltages, phases, and I/O.

Embodiments of the Universal Controller's Protocol Translator (PTE) are comprised of electrical components, software, hardware, and additional components as described below. The PTE enables a cryopump with a communications protocol, that is incompatible with the communications protocol of an existing installed set of cryogenic equipment, to be directly installed and begin to directly communicate and interface with the protocol of the existing installed set of cryogenic equipment, thus enabling system network integration and process tool communication between the existing vendor's network, the process tool and the drop in pump.

This drop-in use of a second vendor's cryopump and controller, with existing cryopump equipment from a first vendor, who is unrelated to the second vendor, expands the equipment availability to the process tool user. By drop-in use it is meant that the second vendor's equipment is functionally usable without adjustment and/or changes to the control system of the equipment of the first vendor or the control system of the facility where first vendor's equipment is installed.

Figure 1B:
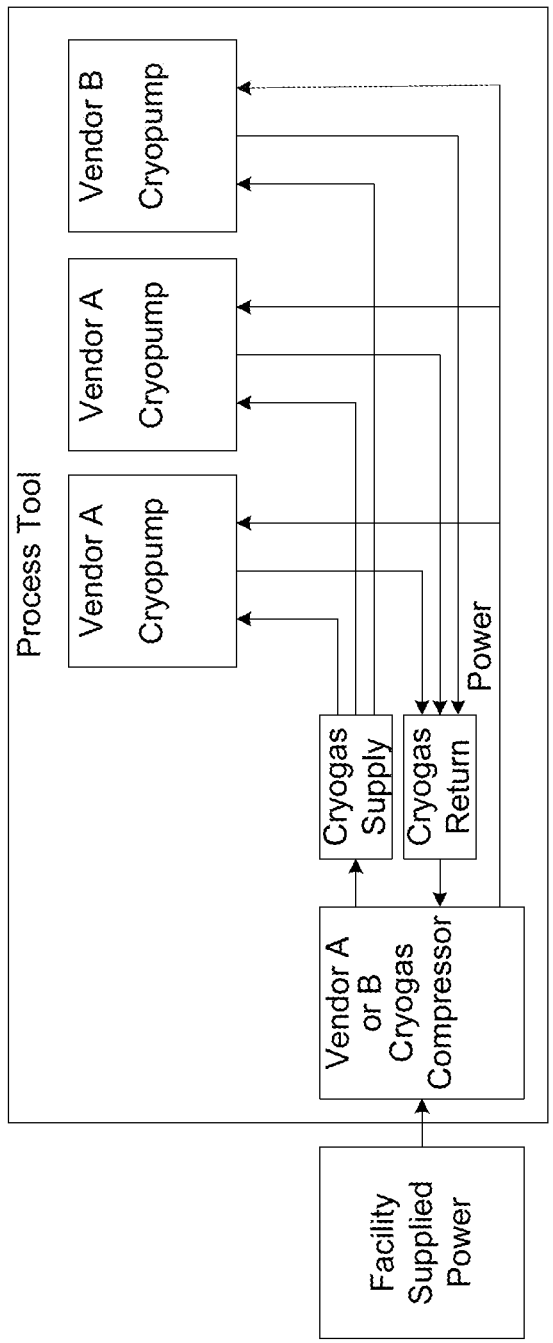
FIG. 1B is a schematic diagram of a high-level overview of a typical cryogenic installation when multiple manufacturers' (A and B) cryopumps are installed on a process tool showing facility power and connections, where different manufacturers' cryopumps have compatible motor phasing and voltage, (via licensing, private labeling or copy) and when the process tool does not have a control system or network integrating the cryopumps I/O to the Process Tool's control system.
Figure 1C:
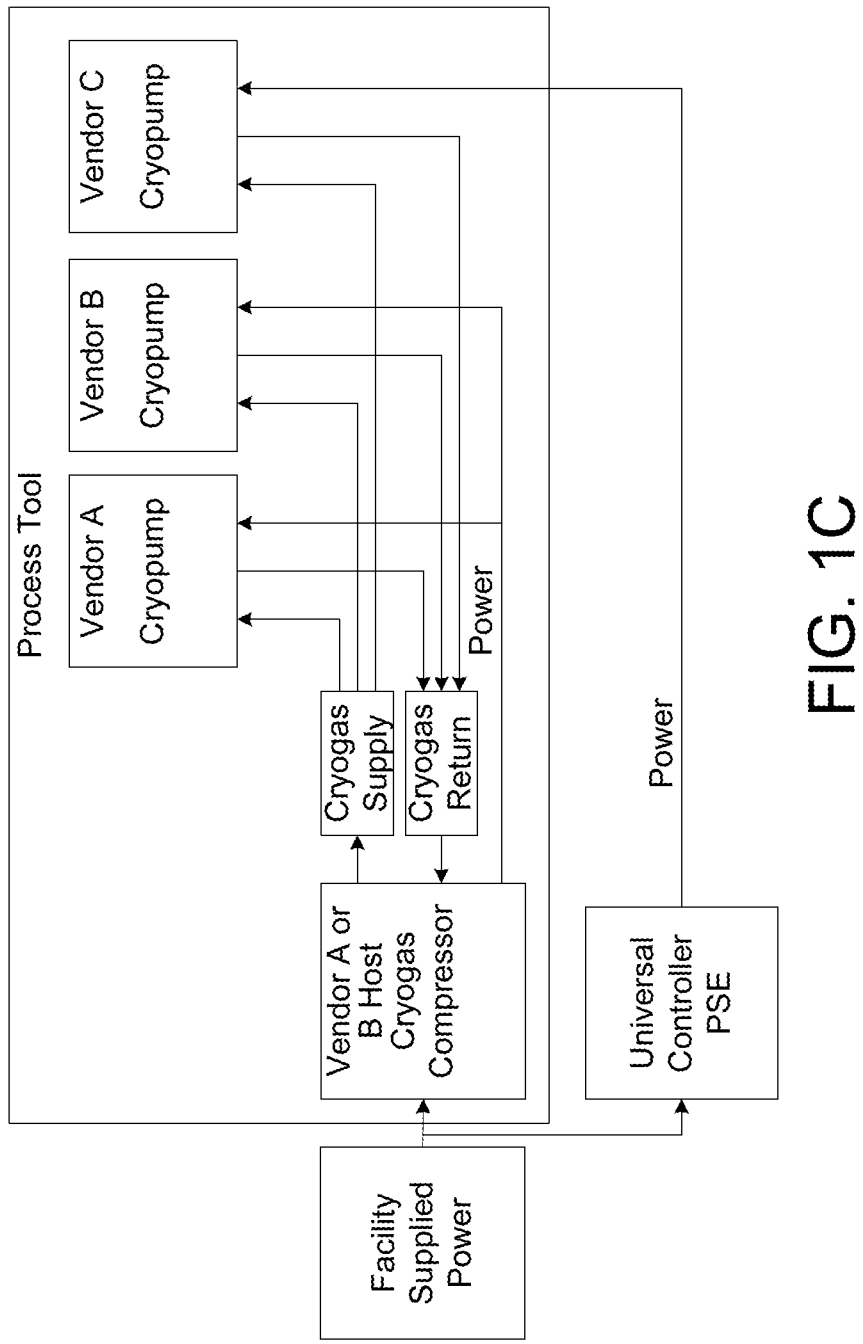
FIG. 1C is a schematic diagram of a high-level overview of a typical cryogenic installation when multiple manufacturer's cryopumps (A and B) are installed on a process tool showing facility power and connections where different manufacturers' cryopumps have compatible motor phasing and voltage, and also a third manufacturer's cryopump (C) is integrated with different phasing and voltage and wherein a Power Supply Element (PSE) equipped cryo compressor from Manufacturer A or B, can drive cryopumps from Manufacturer A, B and C and when the Process Tool does not have a control system or network integrating the cryopumps I/O to the tool's control system.
Figure 1D:
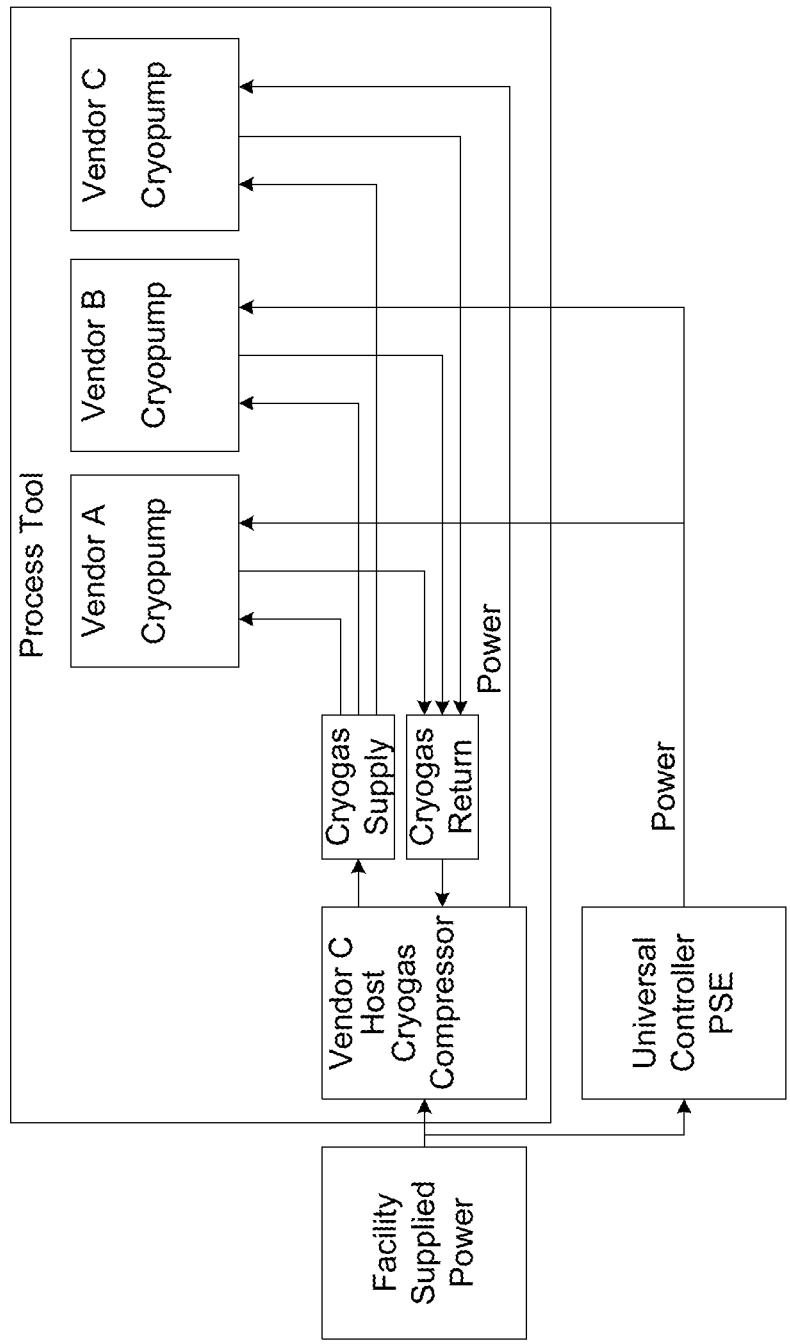
FIG. 1D is a schematic diagram of a high-level overview of a typical cryogenic installation when multiple manufacturer's cryopumps (A, B, and C) are installed on a process tool showing facility power and connections where different manufacturers' cryopumps (A and B) have compatible motor phasing and voltage, and also a third manufacturer's cryopump (C) is integrated with different phasing and voltage, and wherein a Power Supply Element (PSE) equipped cryo compressor from Manufacturer C, can drive cryopumps from Manufacturer A, B and C and when the process tool does not have a control system integrating the cryopumps I/O to the tool's control system.
Figure 1E:
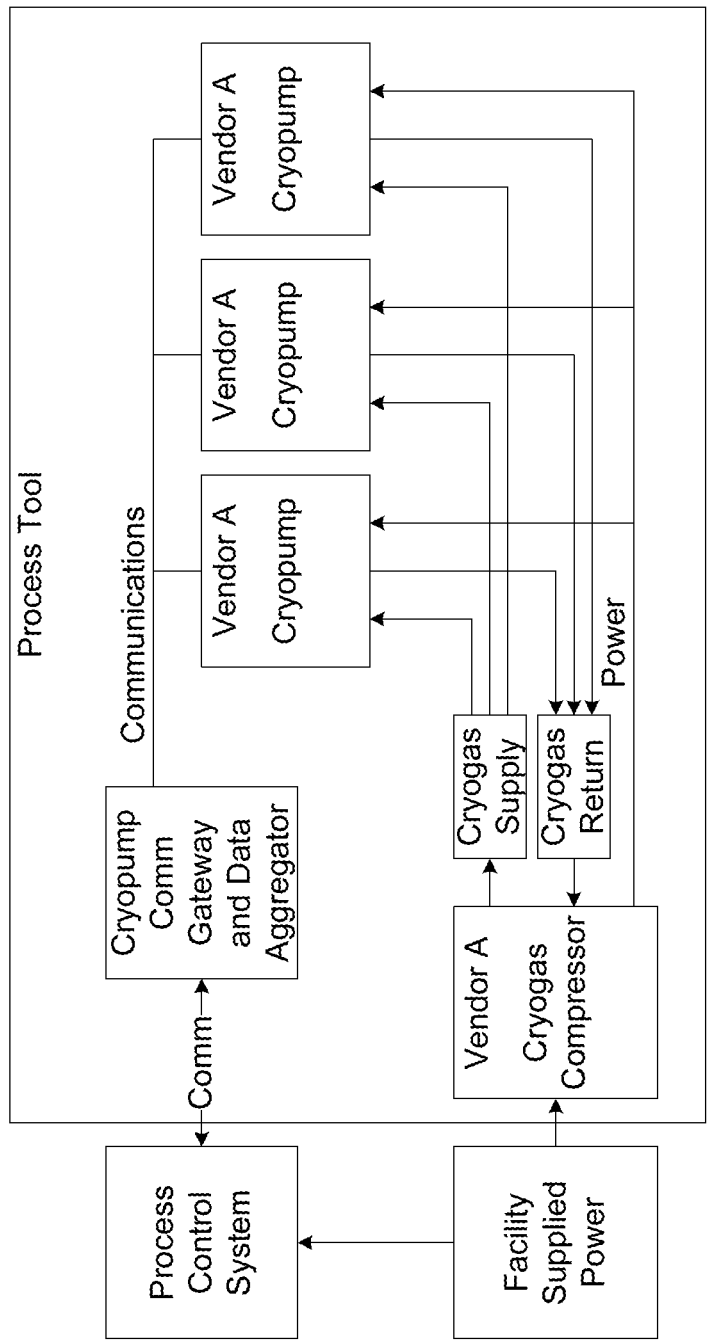
FIG. 1E is a schematic diagram of a high-level overview of a typical single manufacturer sourced cryogenic installation showing facility power and connections between all major components when the Process Tool requires control system integration with the cryopumps I/O to the Process Tool's control system.
Figure 1F:
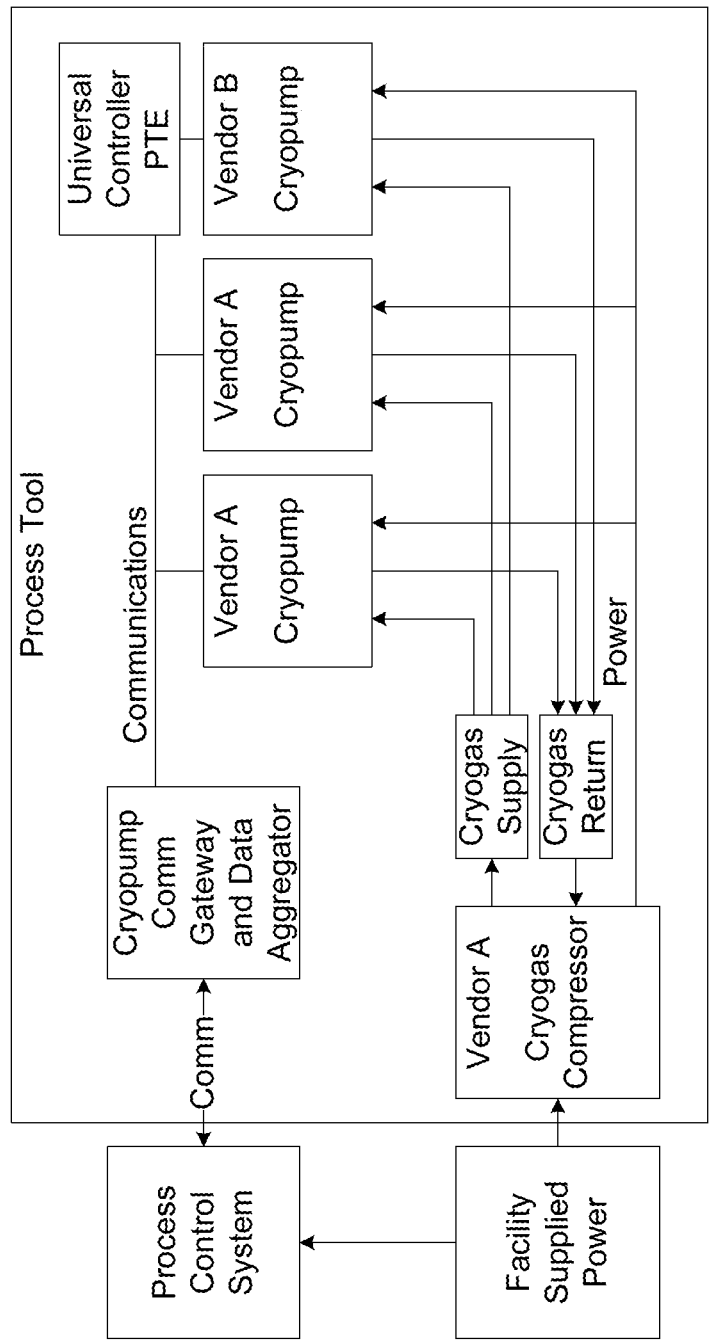
FIG. 1F is a schematic diagram of a high-level overview of a cryogenic installation using cryopumps and cryo compressors from multiple manufacturers, when the phasing and voltages are compatible, and when the Process Tool requires control system integration with the cryopumps' I/O to the Process tool's control system via a Protocol Translator because vendor B's protocol is not compatible with Vendor A's protocol.
Figure 1G:
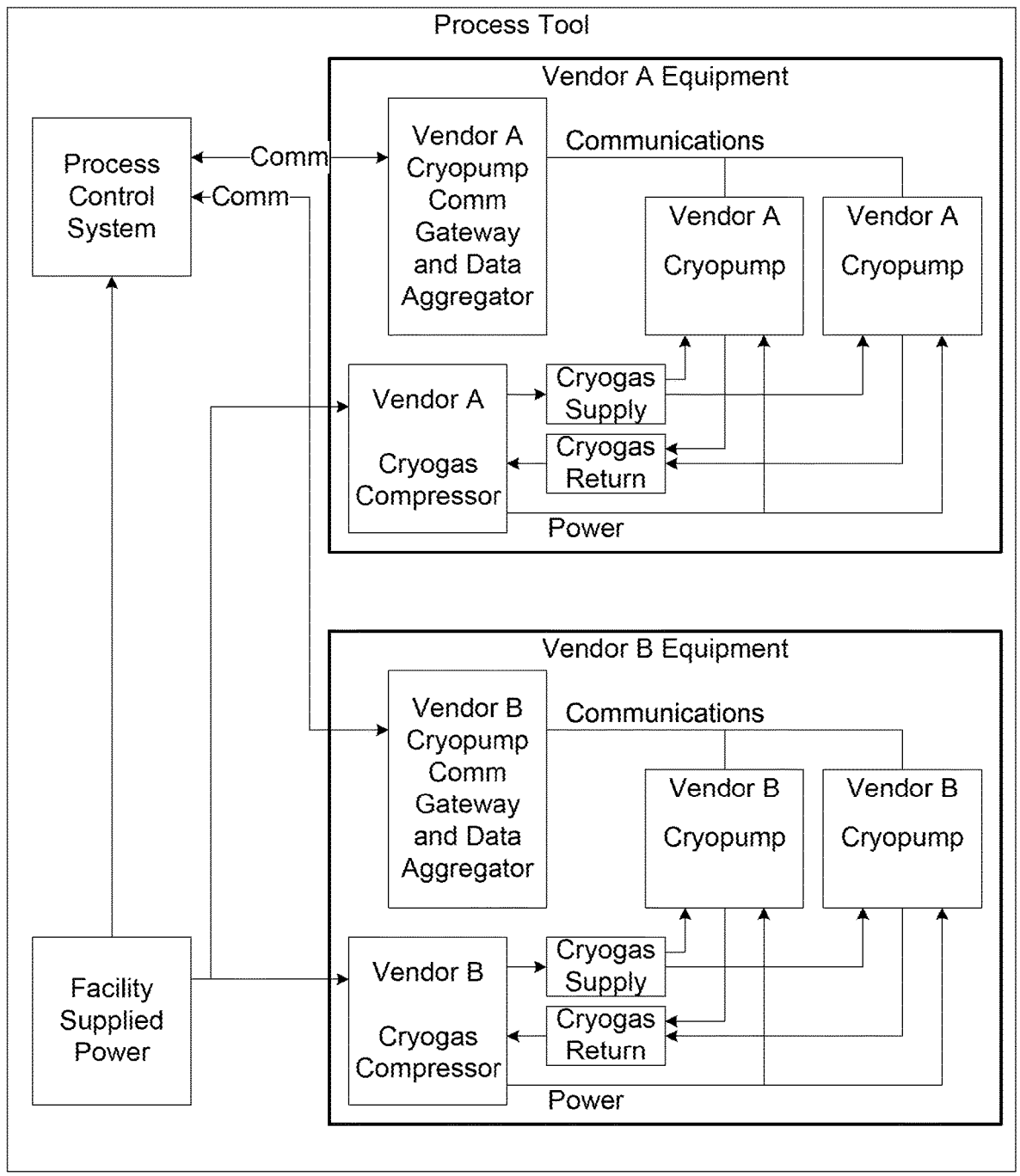
FIG. 1G is a schematic diagram of a high-level overview of a cryogenic installation using cryopumps and cryo compressors from multiple manufacturers, when the phasing and voltages are not compatible, and when the Process Tool requires control system integration with the cryopumps I/O to the tool's control system, but the communication protocol between Vendor A's and Vendor B's equipment is not compatible.
Figure 1H:
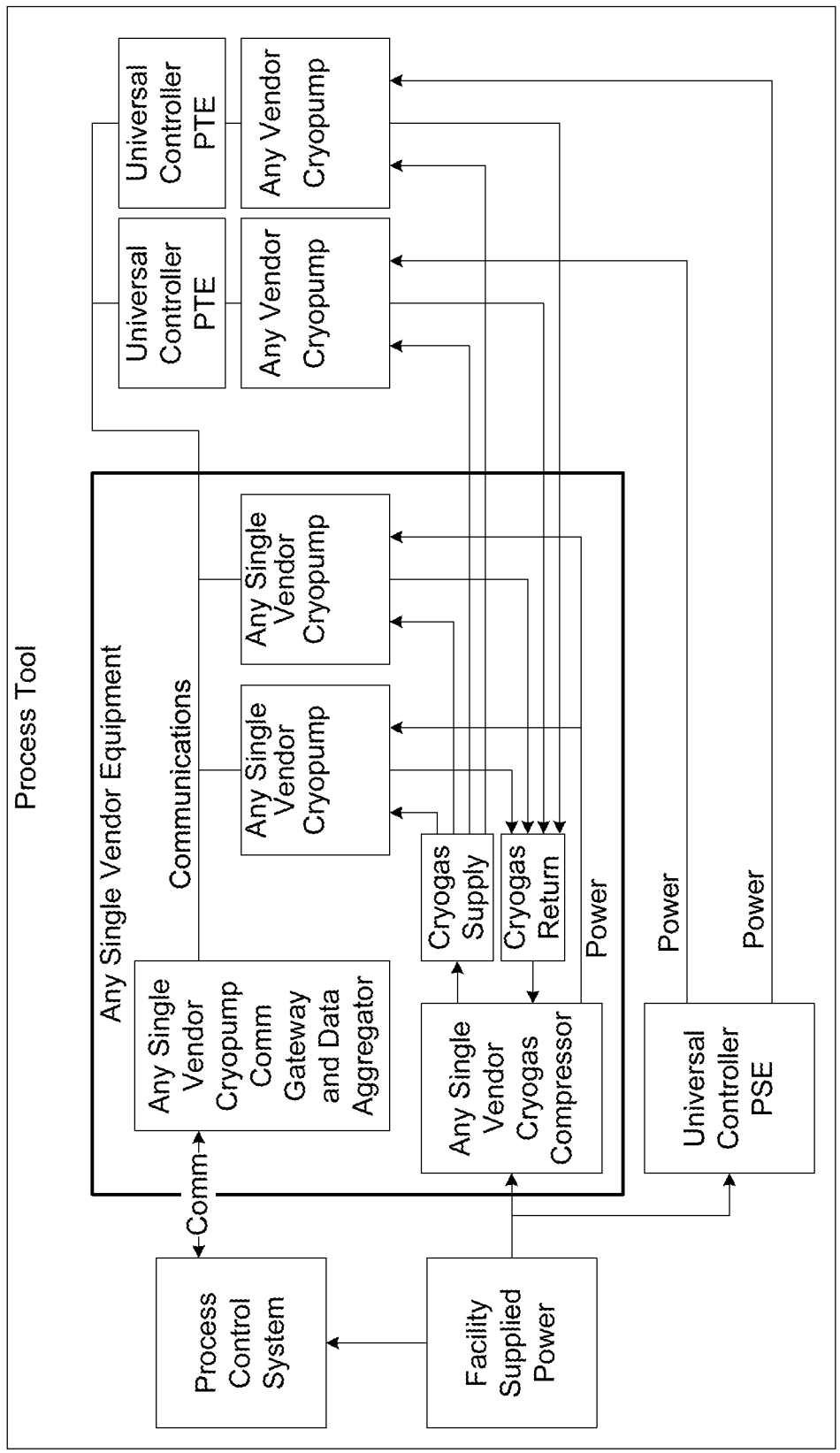
FIG. 1H is a schematic diagram of a high-level overview of a cryogenic installation using a Power Supply Element (PSE) and Protocol Translator Element (PTE) to integrate cryopumps from multiple vendors when the phasing and voltages are not compatible, and when the Process Tool requires control system integration with the cryopumps I/O to the Process Tool's control system.

For example, the Protocol Translator interfaces with the network controller of the first vendor so that an implanter used for ion implantation is satisfied with the same information from the second vendor's cryopump, as it is satisfied from the first vendor's cryopump. See, e.g., FIG. 1H and FIG. 1I.

Additionally, by providing a choice of different vendors via the PSE on a host compressor, the cryogenic equipment now available to the End User may be most suitably paired to the application. For example, a facility requiring cryogenic cooling for a long uptime, can select a cryopump having a longer interval between maintenance than the currently installed equipment. This occurs, for example, in facilities for CVD vapor deposition. Additionally, permitting network interoperability of devices from multiple vendors via the Protocol Translator permits facilities to be economically and efficiently updated with cryogenic equipment most suited to the needs of the process application.

As used herein, "control system" means at least input/output (I/O) control, feedback, and supply capabilities association one or more of the electrical supply systems, communication systems, and/or cryogas supply systems associated with a cryopump and or cryogas compressor.

Forms of the verb "to drive" mean (a) to receive and/or transmit one or more data and/or electrical signals that instruct and/or interface with the control system of one or more cryopumps and or cryogas compressors, and (b) to receive and/or transmit one or more data and/or electrical signals instruct and/or interface with input/output (I/O) control, feedback, and supply capabilities association one or more of the electrical supply systems, communication systems, and/or cryogas supply systems associated with a cryopump and or cryogas compressor.

"Computing device," or interchangeably "hardware," is intended in this disclosure for all purposes to be interpreted broadly and is defined for all uses, all devices, and/or all systems and/or systems in this disclosure as a device comprising at least a central processing unit, a communications device for interfacing with a data network, transitory computer-readable memory, and/or a non-transitory computer-readable memory and/or media. The central processing unit carries out the instructions of one or more computer programs stored in the non-transitory computer-readable memory and/or media by performing arithmetical, logical, and input/output operations to accomplish in whole or in part one or more steps of any method described herein.

A computing device is usable by one or more users, other computing devices directly and/or indirectly, actively and/or passively for one or more suitable functions herein. The computing device may be embodied as computer, a laptop, a tablet computer, a smartphone, a built-in, a component in a device, and/or any other suitable device and may also be a networked computing device, a server, or the like. Where beneficial, a computing device preferably includes one or more human input devices such as a computer mouse and/or keyboard and one or more human interface, such as one or more monitors. A computing device may refer to any input, output, and/or calculating device associated with providing a virtual reality experience to one or more users.

Although one computing device may be shown and/or described, multiple computing devices may be used. Conversely, where multiple computing devices are shown and/or described, a single computing device may be used.

"Computer program," or interchangeably "software," means any set of instructions stored in a non-transitory computer-readable memory or non-transitory computer-readable media for executing one or more suitable functions and/or for executing one or more methods in this disclosure. Even if not explicitly mentioned, in this disclosure, a computing device includes software having any set of instructions stored in non-transitory computer-readable memory or non-transitory computer-readable media for executing one or more suitable functions and/or for executing one or more methods in this disclosure.

Forms of the verbs "instruct" means one or more data representations, electrical signals, and/or mechanical signals that cause one or more predetermined actions in one or more cryopumps and/or cryogas compressors.

Forms of the verbs "interface" means one or more data representations, electrical signals, and/or mechanical signals that indicate one or more functional conditions of one or more cryopumps and/or cryogas compressors.

"Non-transitory computer-readable memory." or interchangeably "non-transitory computer-readable media," may be a hard drive, solid state drive, compact disk drive, DVD drive, and/or the like for storing the one or more computer programs.

The Universal Controller PSE for a cryogas compressor drives, preferably but not necessarily simultaneously, cryogenic expanders having a variety of electrical input requirements. For example, the Universal Controller PSE is used for a helium compressor that can input power to one or more cryogenic expanders that are used to cool cryopumps, MRI magnets, and other cryogenic devices. The Universal Controller PSE and the device that it directly or indirectly controls, and/or its drivers, may be stand-alone in conjunction with a host cryo compressor, (See, e.g., FIG. 1C) or it may be integrated as part of a networked system in which the PSE supports cryopump operation and the Universal Controller Protocol Translator performs a method of controlling the devices and integrating to an existing communications network. (See, e.g., FIG. 1H)

An OEM's cryo compressor can be used as needed to drive any cryopump produced by that OEM, or any other manufactured cryopump that conforms to that OEM's cryopump voltage and phasing requirements via licensing, private label or copy of the OEM's electrical power and controls. (See, e.g., FIG. 1B.)

An OEM cryogas compressor equipped with the Universal Controller PSE (a host cryogas compressor) will maintain its standard electrical power and low voltage controls as provided by the OEM of the host compressor. However, the Universal Controller PSE enables the connection of electrical power and low voltage to any other manufacturer's cryopump, that is not compatible with that OEM's cryopump voltage and phasing, and for which the Universal Controller PSE has been configured. This can be one or more additional manufacturers (See, e.g., FIGS. 1C and 1D). The host compressor's cryogas supply and return circuits will be connected to the other manufacturer's cryopump individually, or in combination via manifolds on the cryogas supply and cryogas return.

The Universal Controller's PSE capability enables a user to combine cryopumps from multiple manufactures and drive them individually or in combination, at the same time on the same cryopump process using a host cryogas compressor that now produces multiple electrical voltage and phasing outputs (via the Universal Controller PSE) to control the variety of different cryopumps in addition to the 1 set of electrical outputs designed to drive the single particular electrical design requirement as defined by the host compressor's OEM manufacturer.

When the host cryogas compressor is started, it provides the needed stream of compressed cryogas to flow to the various cryopump(s), singular or multiple, and the Universal Controller PSE provides the various electrical voltages and phasing to power the cryopump's motors, and also provides the low voltage power for the control circuits of each cryopump, for which the Universal Controller PSE has been configured.

The Universal Controller PSE receives a single facility electrical voltage and phasing, for example 208 VAC, 3P, 60 Hz, and produces multiple different, but specific, output voltages and phasing needed to power cryopumps from different manufacturers. Each manufacturer has a defined voltage and phasing requirement for its cryopumps and each manufacturer has a cryogas compressor with electrical outputs designed to provide the specific voltages and phasing needed to drive their cryopumps.

When cryopumps have different electrical requirements, a cryogas compressor from one manufacturer cannot power the cryopumps of another manufacturer because the cryogas compressors have different voltage and phasing outputs.

The Universal Controller PSE is used to operate one or more cryopumps. These cryopumps typically use a 'synchronous motor' for operation. This motor requires 2-phase power supply with a 90-degree phase angle for smooth operation. Synchronous motor use is not limited to cryopumps. Numerous products in different industries are designed around synchronous motors. With the Universal Controller PSE these industries can use the Universal Controller's PSE quality power sources to reduce mechanical vibration, bearing wear and acoustical noise. Also, the Universal Controller PSE can be used to drive multiple synchronous motors each having different voltage and phasing requirements. The Universal Controller PSE can also supply 3-phase power for other devices that have 3-phase expander motors.

The targeted cryopump application requires three power sources with different voltage, current and phase requirements. This targeted application operates with lower mechanical vibration due to the accurate creation of a 2-phase voltage with a 90-degree phase angle. Other low-cost approaches use a less expensive resistor-capacitor phase-shift circuit that results in higher vibration leading to acoustical noise and increased bearing wear. The Universal Controller's PSE implementation is a superior approach.

Additionally, for expanded application on networked systems, low voltage power is provided to the cryopumps which enables the cryopumps via the Protocol Translator to communicate their status to the network and thereby communicate the operational state of the cryopump to a Process Tool. (See, e.g., FIG. 1H)

Construction: Universal Controller PSE

The construction of the Universal Controller PSE requires an enclosure to house the circuitry and protect the user from high voltages. The enclosure has the necessary cutouts and features to mount front-panel indicators, user-accessible circuit breakers or fuses, external connectors and wire glands for cables that traverse the external/internal boundary. Wiring, termination and assembly procedures follow national electric codes, NEC, and use safety rated components. The enclosure size is adequate to house the components, with required air separation for sufficient device cooling and maintenance access for in-field diagnostics and repair.

Indication and Communication

Figure 7:
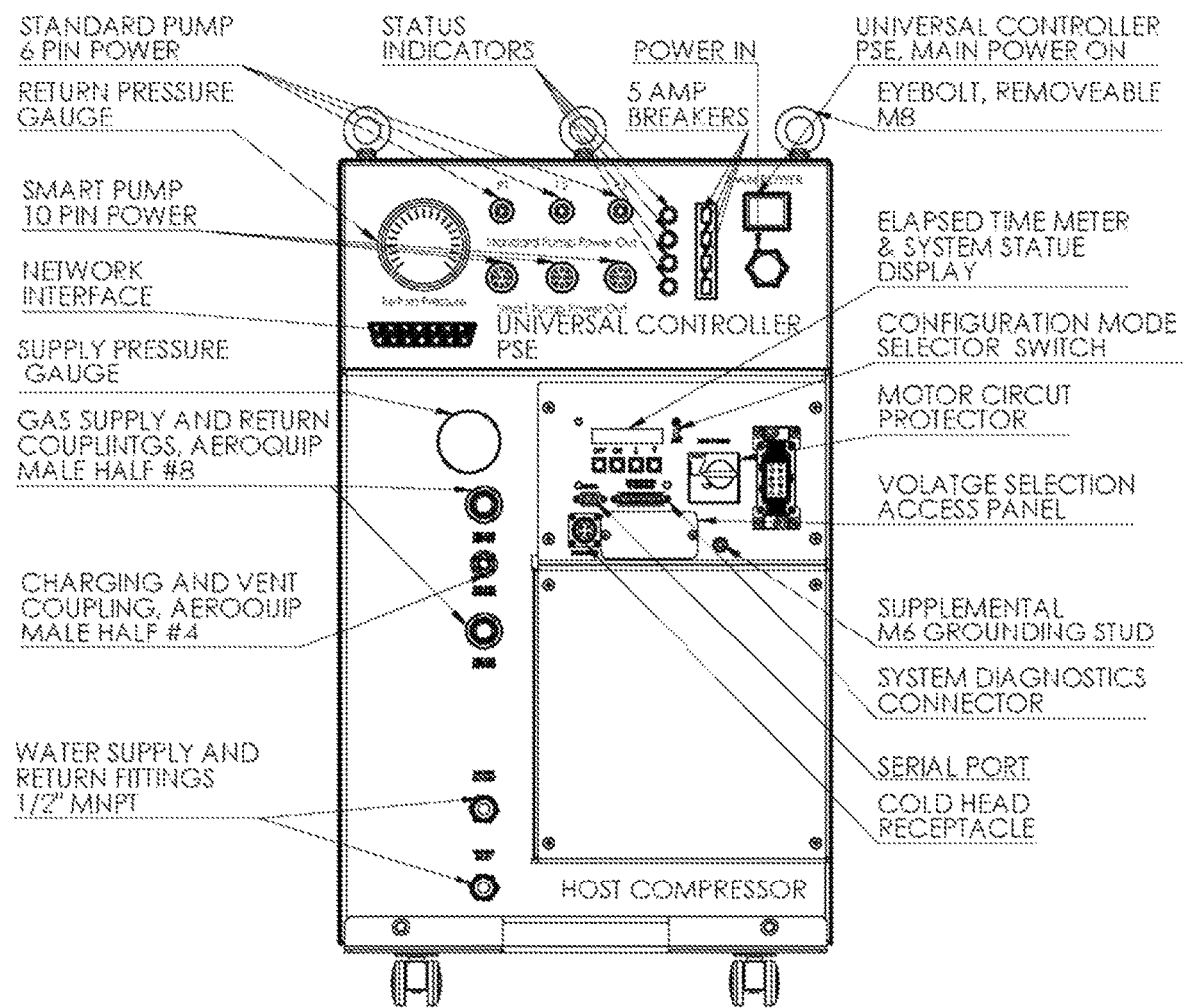
FIG. 7 is a front view of an embodiment of a host compressor and a top integrated Universal Controller Power Supply Element (PSE) enclosure showing the electrical power and I/O connection for the host compressor and the electrical and I/O connections on the PSE enclosure which is configured to drive cryopumps made by a different manufacturer than the host compressor.

The Universal Controller PSE employs a front panel system operation indication system, requiring the user to view the physical device from the front side. The Universal Controller PSE is structured for a network-connected monitoring solution, removing a locality viewing requirement, and enabling users to remotely monitor the Universal Controller's operational status. See, e.g., FIG. 7. This remote network-connected monitoring solution will also have historical performance logging. This accelerates post-event forensic analysis and issue mitigation.

Future deployments include, but are not limited to, new cryopump and expander designs using different power requirements, and non-cryogenic applications having still different power requirements. Supplemental power sources or modifications to existing sources can be added to the Universal Controller PSE without requiring significant development effort or cost. This ability to easily add additional power sources permits multi-vendor equipment deployments, which eliminates single-source scenarios and offers more low-cost competitive solutions for End Users. There is no physical limit to the amount of power sources that can be added to the current invention.

Certain field applications do not require all the current targeted cryopump power sources. The Universal Controller's PSE power sources are not coupled; therefore, any output power source can be removed without affecting the remaining power sources operation. Removal of a power source results in a lower bill-of-material cost that translates to a lower cost product for the customer.

Use Cases: Universal Controller PSE and PTE

The following are two (2) applications that are possible due to the Universal Controller PSE and PTE and their ability to interface with different platforms. In each case, the Universal Controller enables an End User to source and employ a cryopump(s) and/or cryo compressor(s) from different vendors, which bring superior performance over the currently installed cryopump(s), and/or cryo compressor (s) to solve a production problem; while minimizing capital expenditures by not requiring a full conversion to a different technology platform for all the cryopump(s) and/or cryo compressor(s) but only for the cryopumps and/or cryo compressor(s) of concern.

Example 1: Universal Controller PSE

In certain applications, particularly Ion Implant on 200 mm semiconductor tools, Vendor "A" cryopumps can carry up to 17-20 liters of cryogenic hydrogen before needing to be regenerated. This limit on the amount of hydrogen is due to limited absorption area for hydrogen and because Vendor "A" prefers to limit the carrying capacity of hydrogen as the cryopump has an internal heater that could possibly act as an ignition source during regeneration in the case of a gross failure of the heater. Consequently, it is safer to regenerate with a small amount of hydrogen in the cryopump instead of a large amount of hydrogen in the cryopump just in case an ignition event occurs. The Implant process is typically three weeks long, and the regeneration interval for the Vendor "A" cryopump is typically every two weeks.

Figure 8C:
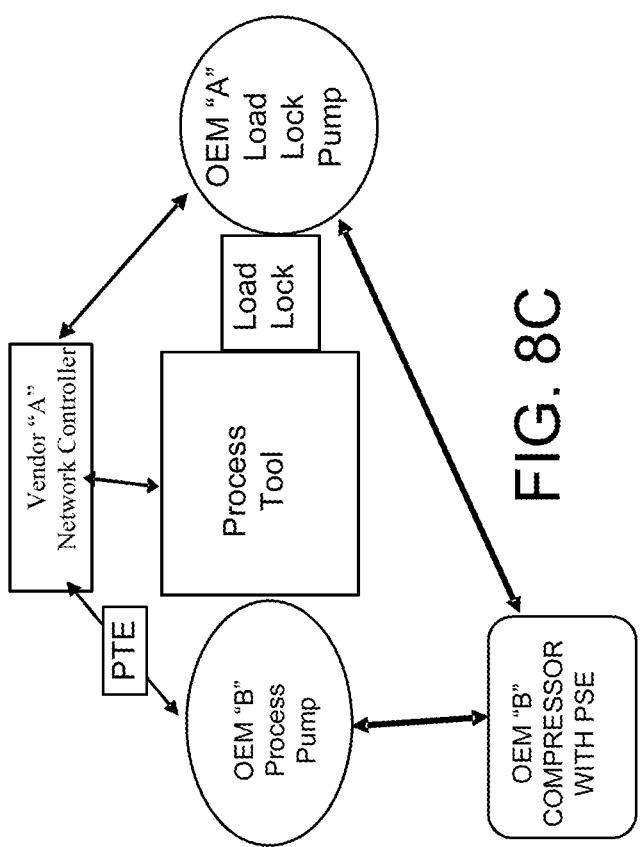
FIG. 8C is a block diagram showing the replacement of Vendor A's Process cryopump with a higher performance Vendor B cryopump, a Vendor B host compressor that will drive the Vendor B cryopump and a Universal Controller Power Supply Element (PSE) that will drive the remaining Vendor A Load Lock cryopump.

While the cryopump needs to go into regeneration for the above safety purposes, the Ion Implant process run cycle is not completed and the process is suspended while the Vendor A cryopump is regenerated and brought back to proper cryogenic operation. An additional complicating factor is that the cool-down time of the Vendor A cryopump is excessive due to low helium flow in the system which further delays startup of the process. Once the cryopump is back in operation, the interrupted Ion Implant process is continued. However, this interruption of the process exposes the process to risks and the potential of manufacturing defective products; which defects cannot be measured until several subsequent manufacturing steps are completed. Therefore, the Ion Implant process, if continued, is at risk of processing possibly thousands of defective product units due to the premature requirement to regenerate the Vendor A cryopump. See, e.g., FIG. 8A-8B.

Equivalent physical sized Vendor B cryopumps can carry 30 to 50 liters of hydrogen without the risk of an ignition event. This is because the Vendor B cryopumps have ample hydrogen absorption area compared to Vendor A, and also uses external heaters on the outside of the cryopump vessel and do not have internal heaters. Since there is no ignition source inside the Vendor B cryopump, and since the Vendor B cryopump can carry substantially more hydrogen, the Implanter process does not have to be interrupted to support a cryopump regeneration. The result is that the cryopump can support the entire Implant process cycle which is typically 3 weeks long, and the huge uncertainty regarding the quality of product after a cryopump regeneration is eliminated. An additional benefit is that the Vendor B cryopump has a substantially faster cool-down time, so when it is regenerated at the end of the 3-week Tool process time, the recovery of the tool is faster and it can go into production more quickly. However, the Vendor B cryopump requires a significantly different control platform, phasing, and voltages than the Vendor A cryopump and cannot be driven by the Vendor A cryogas compressor.

The above application requires the installation of a Vendor B cryopump on the Implanter Process Chamber, however, there is also a Load Lock chamber on the Implanter that has a Vendor A cryopump installed. A Vendor A cryo compressor drives both the Process Chamber cryopump and the Load Lock cryopump. There is no need to replace the Vendor A Load Lock cryopump because it is operating satisfactorily, is only handling air, and there is no risk of ignition of hazardous gases. To address these issues, a Vendor B cryo compressor is selected to host the Universal Controller PSE and thereby drive the Vendor B cryopump on the Process Chamber and drive the Vendor A cryopump on the Load Lock. (See, e.g., FIGS. 8C-8D)

Furthermore however, the Vendor B Cryopump uses a different communication protocol than Vendor A, and therefore is unable to communicate across the Vendor A network. Consequently, the Universal Controller Protocol Translator (PTE) is also installed to enable Vendor B's cryopump to communicate over Vendor A's network to the Ion Implant Controller. (See, e.g., FIGS. 8C-8D)

The installation of both elements of the Universal Controller (PSE and PTE) enables the End user to remove the inefficient Vendor A Process Chamber cryopump, install a superior Vendor B cryopump on the Process Chamber, eliminate product risk, and minimize capital expenditures because the End User does not have to also replace the Vendor A Load Lock cryopump. The Vendor B host cryo compressor equipped with a Universal Controller PSE will drive both the Vendor B cryopump on the Implanter Process Chamber and also the Vendor A cryopump on the Load Lock chamber. Additionally, the Universal Controller Protocol Translator will enable the Vendor B cryopump status to be communicated to the Ion Implanter Controller via the Vendor A network.

Alternatively, the Universal Controller PSE could be installed on the Vendor A compressor thus enabling it to drive the Vendor B Process Chamber cryopump, while the Vendor A compressor continued to drive the Vendor A Load Lock cryopump. However, the improved cool-down time for the Vendor B Process Chamber cryopump would be diminished because the Vendor A cryo compressor supplies slightly less helium than the Vendor B cryo compressor. Also, the Universal Controller PTE would also need to be integrated into the Vendor B Process pump to enable its communication over the Vendor A network.

Example 2: Universal Controller PSE and PTE

Figure 8E:
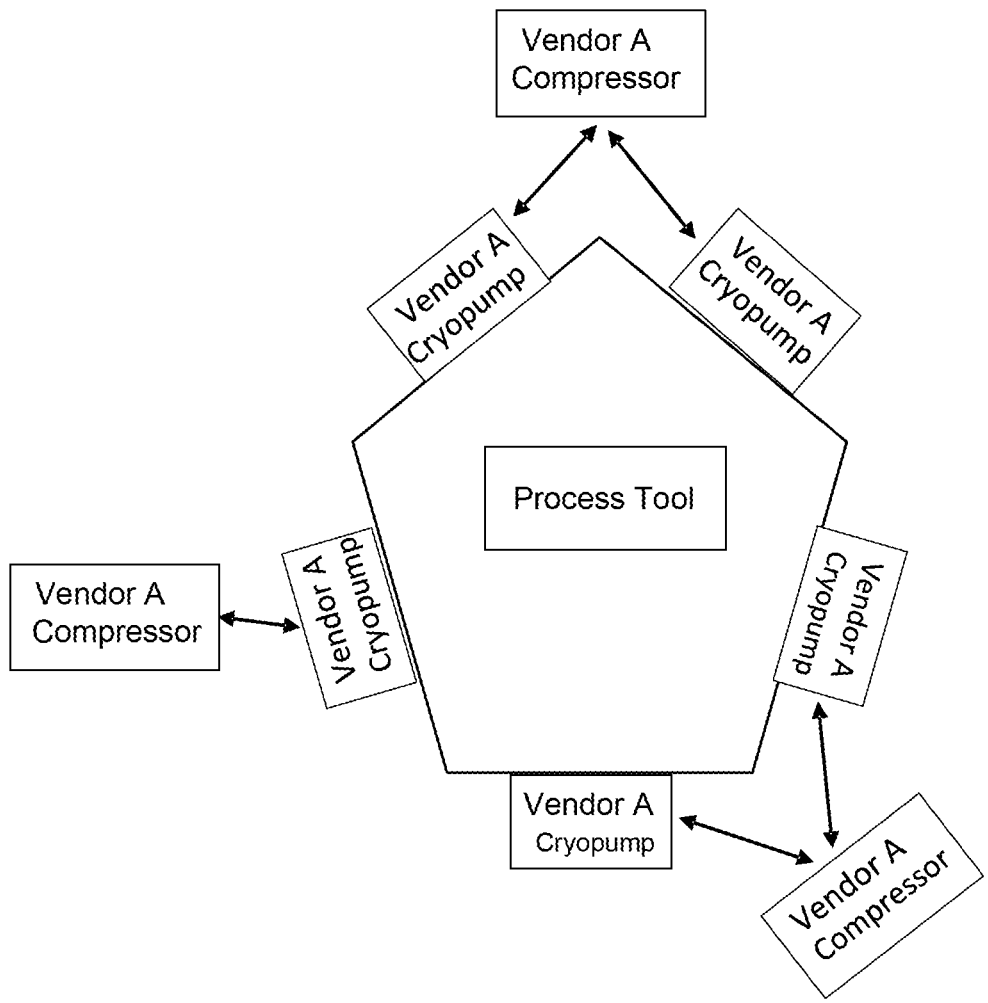
FIGS. 8E and 8F are block diagrams illustrating the addition of an embodiment of the Universal Controller to a Vendor B cryo compressor and the replacement of three (3) Vendor A cryo compressors with two (2) Vendor B cryo compressors enabled by the Universal Controller.
Figure 8F:
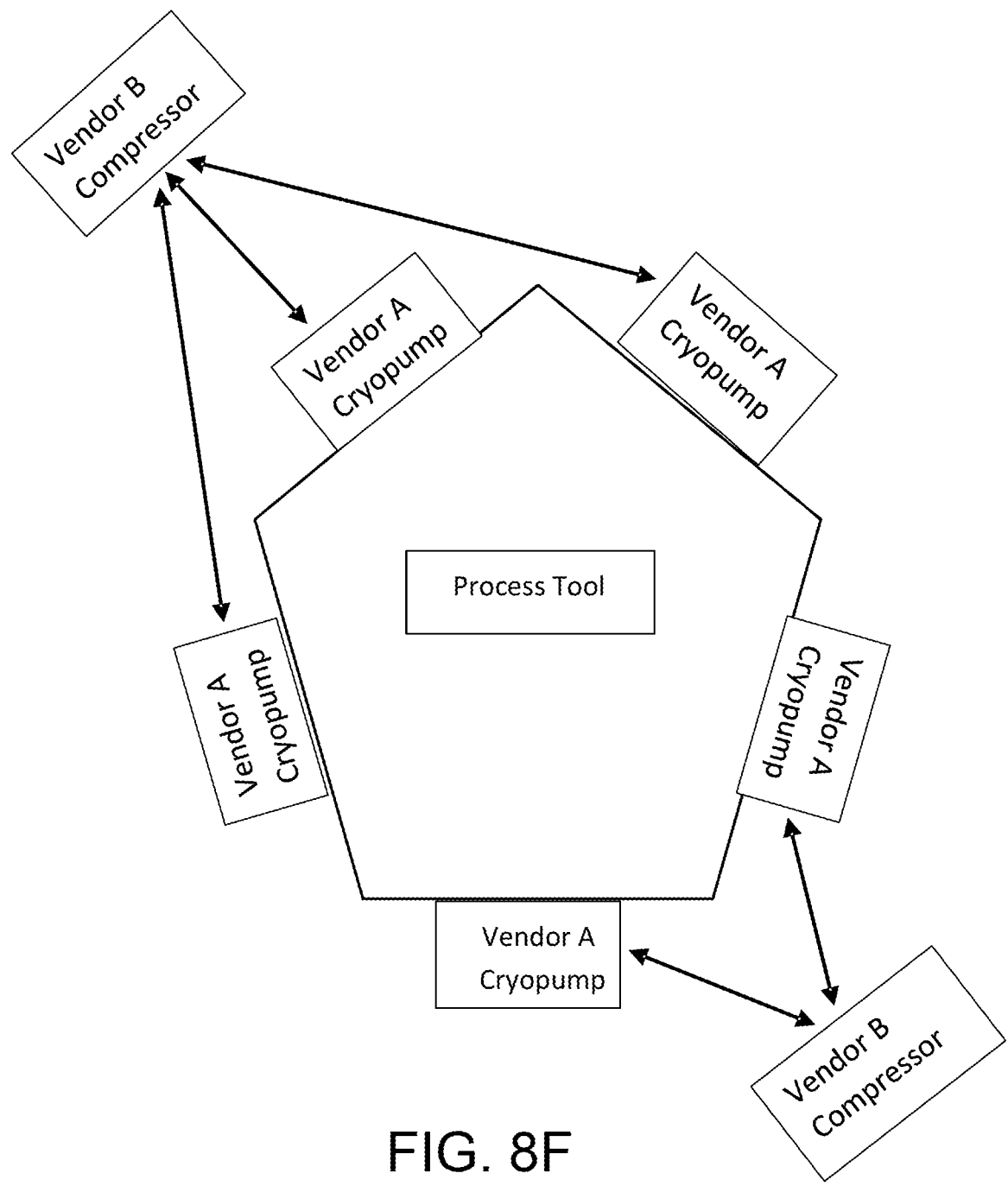

A manufacturer has a multi-chambered (five (5) chambers) process tool which has a Vendor A cryopump on each Process Chamber. The Vendor A cryo compressor can only drive two (2) each of the cryopumps due to lack of helium compression capacity. Consequently, such a system require three (3) compressors to support the process tool's five (5) cryopumps. Additionally, the Vendor A cryo compressors are aging and in need of replacement. A Vendor B cryo compressor is more efficient and able to deliver additional helium cooling capacity and, therefore, is able to drive three (3) Vendor A cryo pumps. However, the Vendor B cryo compressor does not have the control platform, phasing and voltage needed to drive the Vendor A cryopumps. The addition of the Universal Controller PSE to the Vendor B cryo compressor enables it to drive three (3) each of the Vendor A cryopumps, and thereby requires the purchase of only two (2) Vendor B cryo compressors instead of three (3) of the Vendor A compressors to fully support the five (5) cryopumps. Additionally, the End User now has the option to integrate Vendor B cryopumps onto the multi-chambered process tool for superior performance at its convince as Vendor A pumps become in need of maintenance, or are retired. (See, e.g., FIGS. 8E and 8F).

Lastly, should the Process Tool require cryopump operational status updates, the addition of the PTE enables Vendor B's pumps to communicate over Vendor A's network controller.

Specific Implementations

Universal Controller Power Supplies Element: Transformer-Based

Figure 2A:
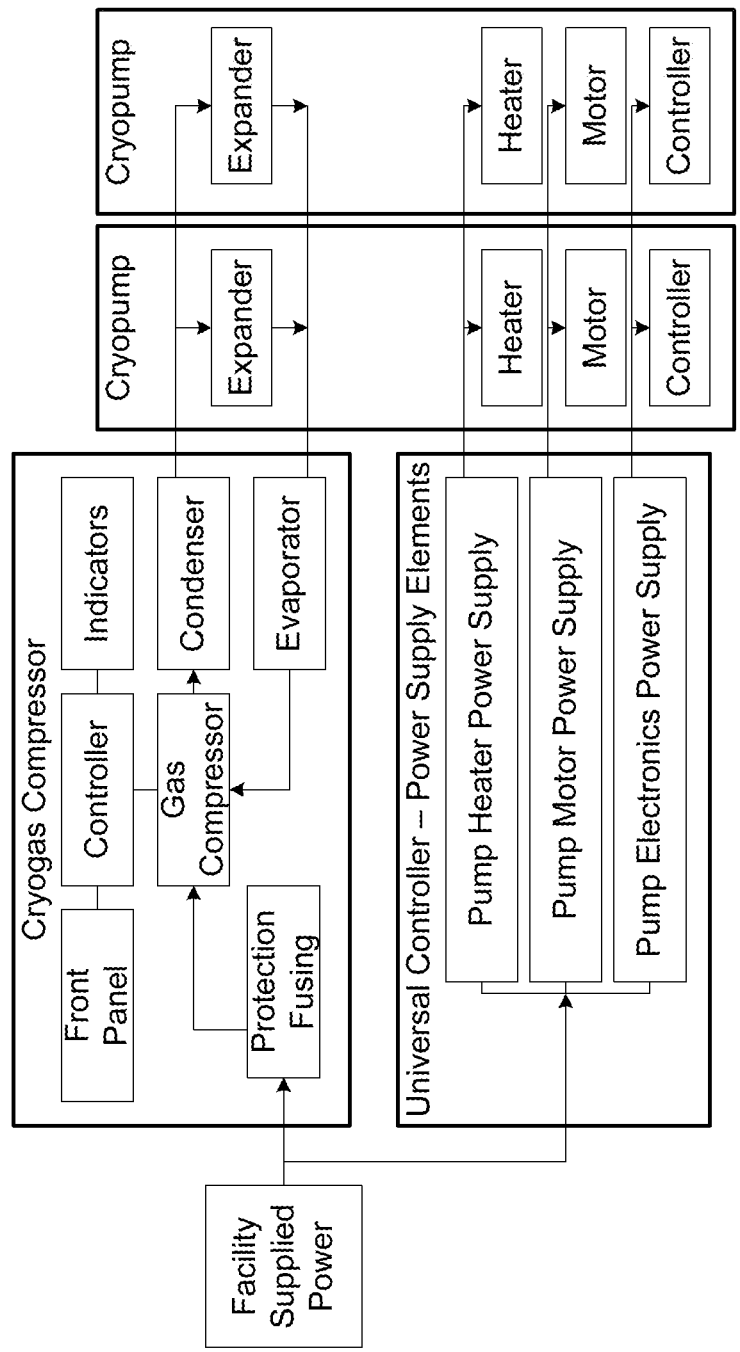
FIG. 2A is a schematic diagram of a cryogas compressor block diagram with cryogas compression and a Universal Controller Power Supply Element (PSE) required for cryopump operation.
Figure 2B:
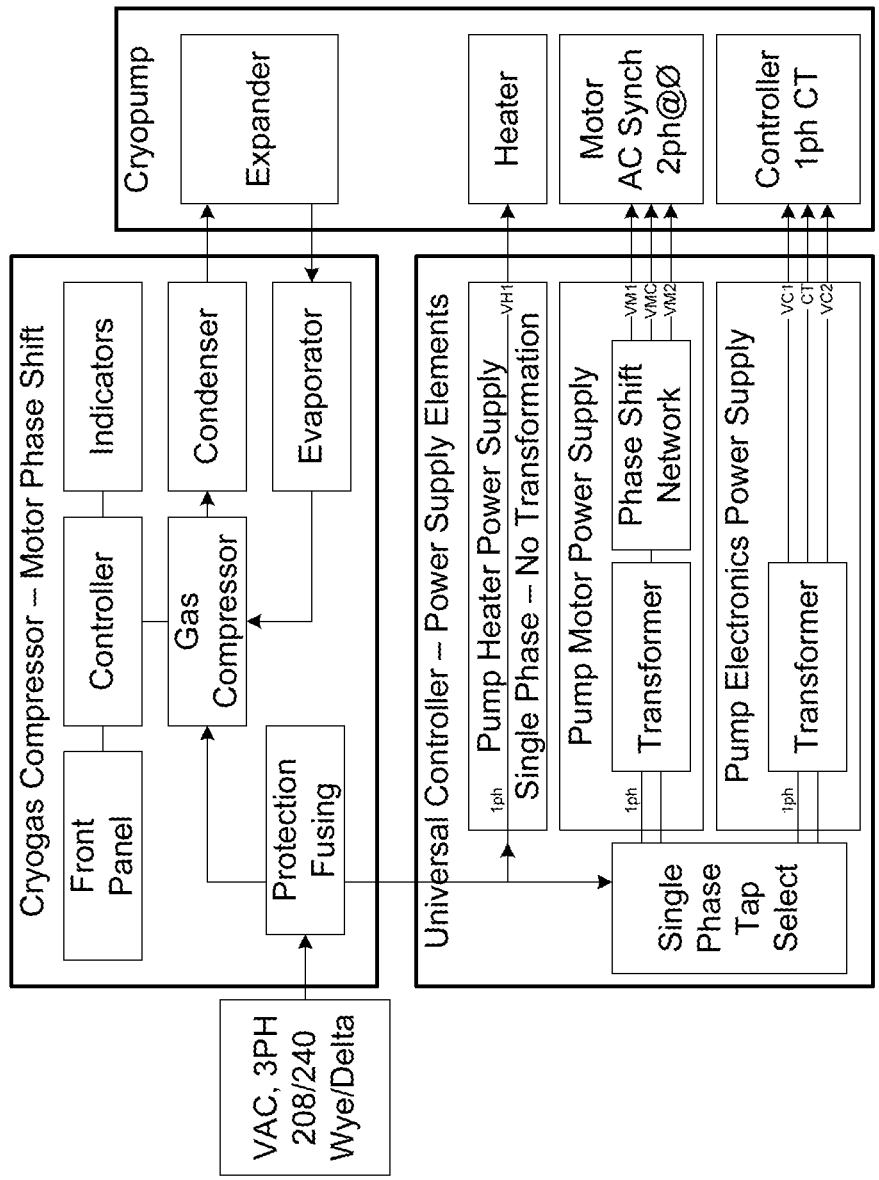
FIG. 2B is a schematic diagram of a cryogas compressor block diagram showing 208/240 VAC, 3-Phase input voltage selection and cryopump motor supply using a Universal Controller Power Supply Element (PSE) providing a phase-shift network for 2-phase cryopump motor power generation.
Figure 2C:
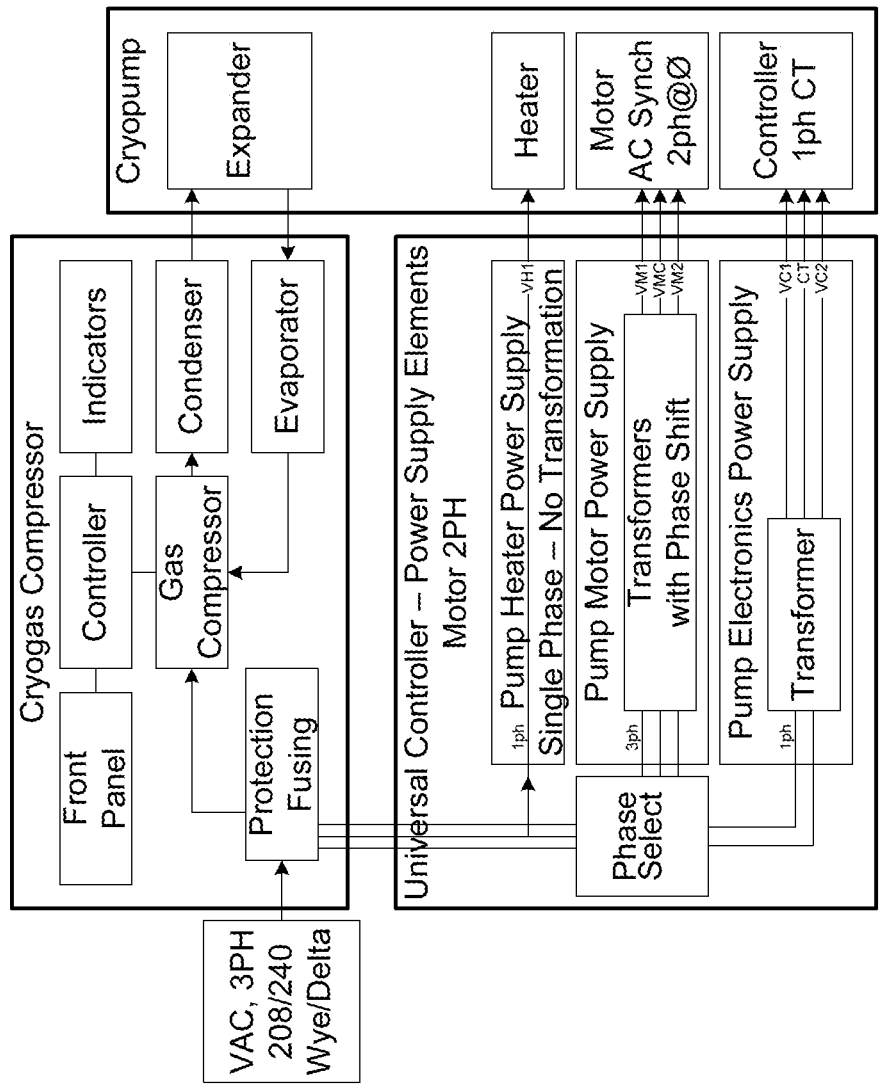
FIG. 2C is a schematic diagram of a cryogas compressor block diagram with 208/240 VAC, 3-Phase input voltage selection and cryopump motor supply using a Universal Controller Power Supply Element (PSE) transformer arrangement for 2-phase cryopump motor power generation.
Figure 2D:
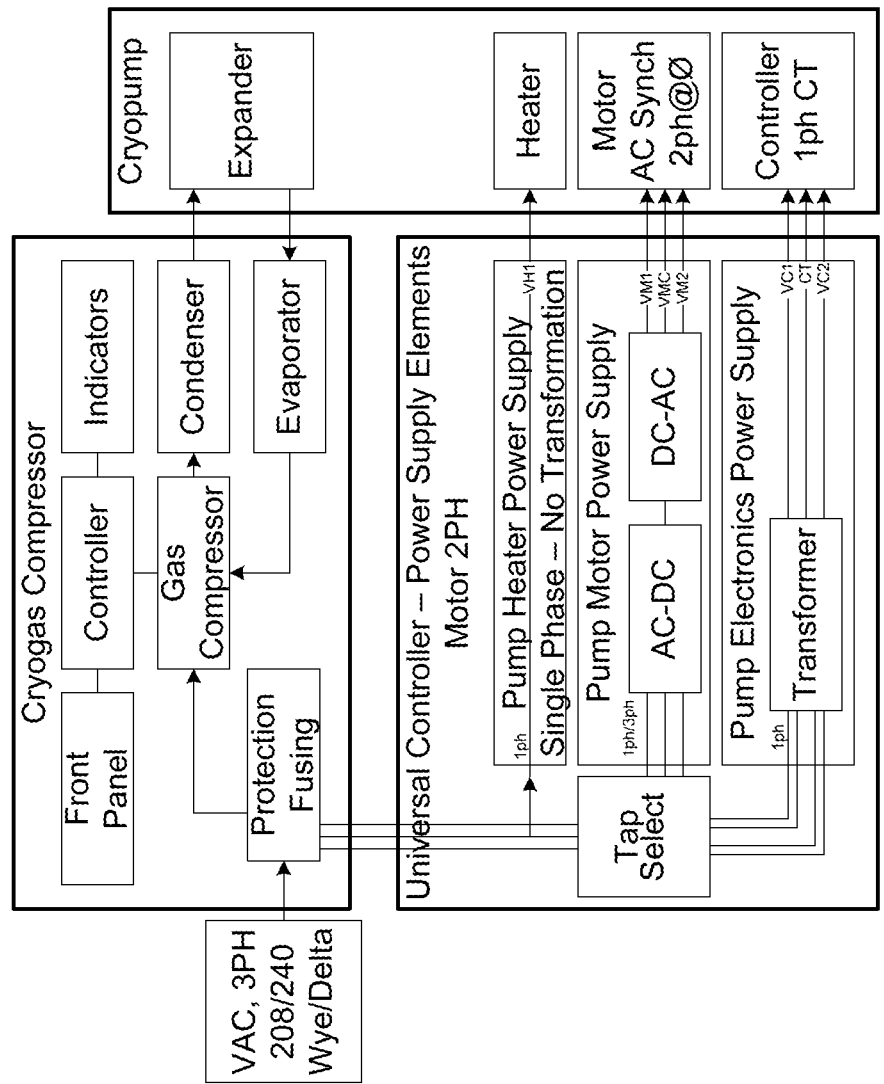
FIG. 2D is a schematic diagram of a cryogas compressor block diagram showing 208/240 VAC, 3-Phase input voltage selection and cryopump motor supply using an AC to AC via a Universal Controller Power Supply Element (PSE) providing an internal DC voltage and phase shift converter for 2-phase cryopump motor power generation.
Figure 3:
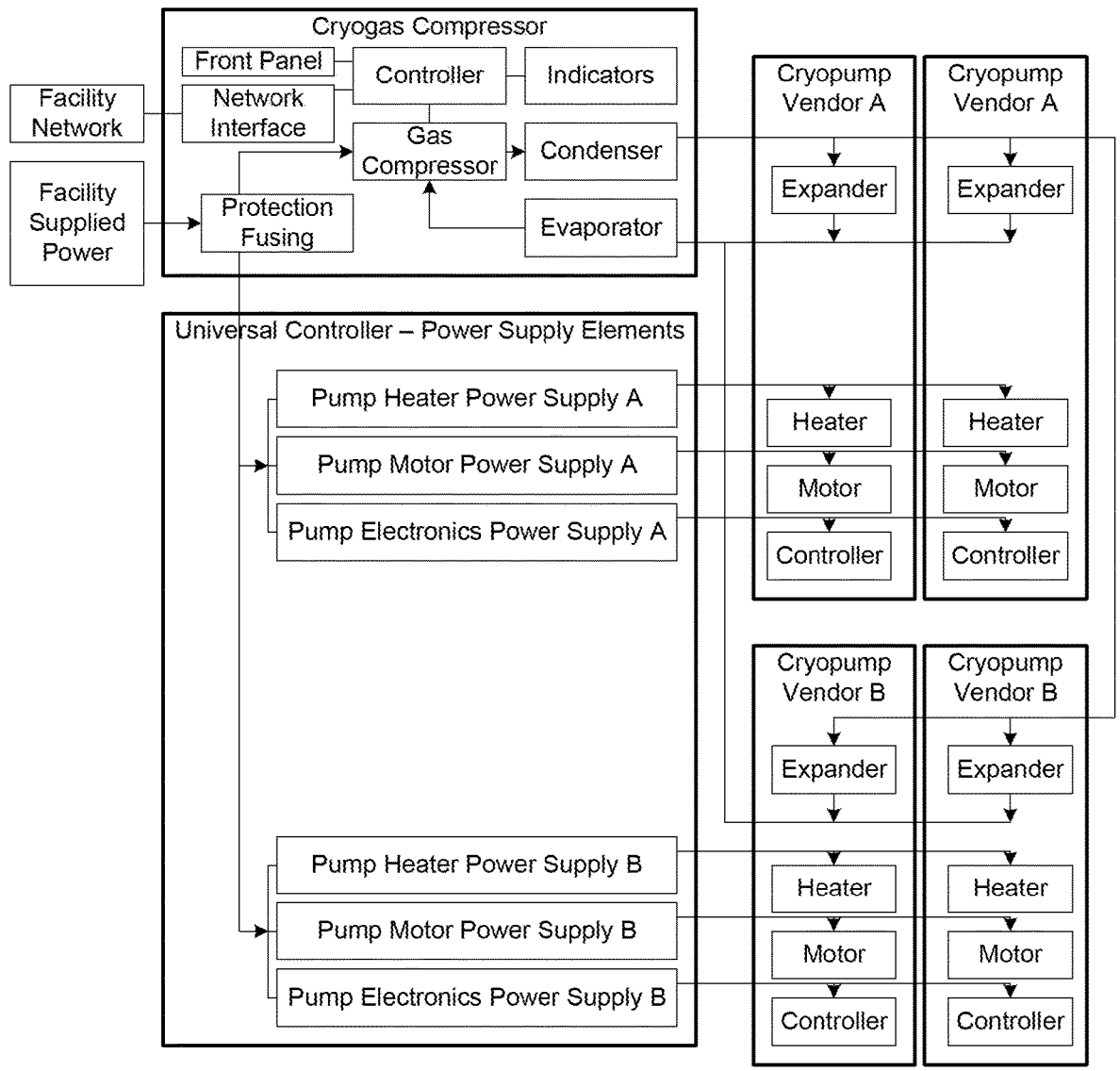
FIG. 3 is a schematic diagram of a host cryogas compressor with a Universal Controller Power Supply Element simultaneously providing compressed cryogas and power to multiple vendor's cryopumps. Each vendor's cryopump power requirements (voltage, current and phase) are unique, requiring a separate heater, motor and electronics power supply for each vendor.
Figure 5:
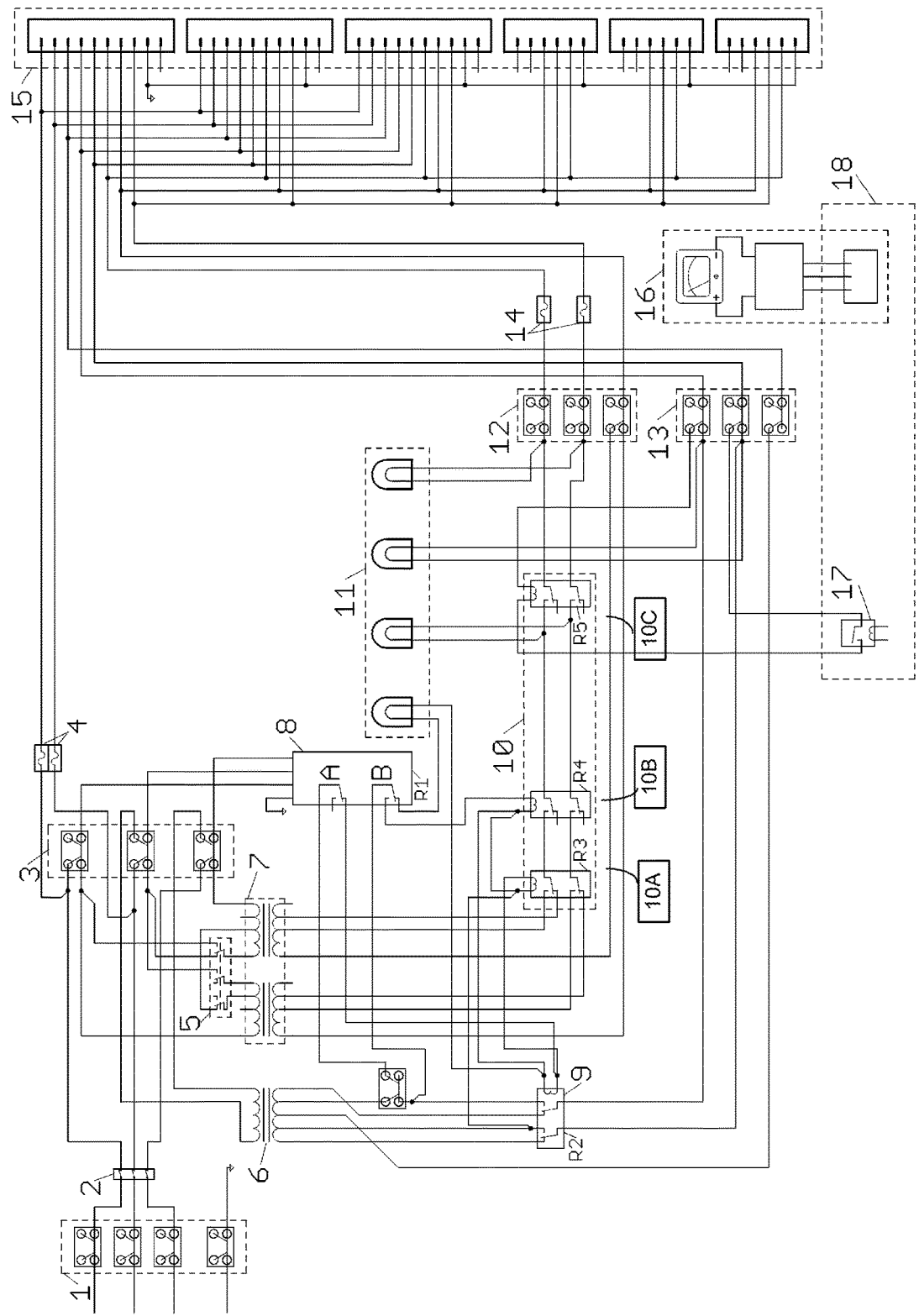
FIG. 5 is an abbreviated schematic drawing of an embodiment of a Universal Controller Power Supply Element (PSE) transformer-based design.

FIG. 2C shows the universal controller block diagram with multiple transformer-based power supplies for voltage and phase-shift conversion. FIG. 5 illustrates an abbreviated schematic for this specific implementation, specifically the transformer-based design abbreviated schematic.

The major power supply element (PSE) components are shown in the FIG. 5 schematic. Incoming two-phase power and facility ground connection terminates in four (4) terminal blocks 1. The facility ground is then connected to the PSE chassis. The three-phase power lines continue through their respective terminal block 1 to the first protective component, a circuit breaker 2. The circuit breaker 2 may be operator front-panel accessible. These now breaker-protected power lines then connect to three (3) more expansion terminal blocks 3, powering four (4) aspects of the protocol translator element (PTE): cryopump heater power, phase-detect/voltage level relay, low-voltage power, cryopump motor power.

Two single phase wires pass through two additional circuit-breakers 4 eventually terminating in three (3) multi-pin rear-mounted connectors 15. This sub-circuit powers cryopumps regenerative heater coils.

All three phases continue from terminal blocks 3 to a multi-function relay 8. Functions are phase-orientation correctness and voltage level threshold. These functions drive two internal relays, internal relay 8A and internal relay 8B, each with exposed contacts. The synchronous cryopump motor's spin rotation requires phase orientation correctness. Operating the cryopump motor backwards leads to damage, repair and system downtime. Two conditions need to exist to energize the lower relay 8B: correct phase orientation and all three incoming voltages exceed an adjustable minimum threshold level. The lower relay 8B contacts complete one of two circuits. When conditions are not fulfilled, a front-panel indicator 11A illuminates indicating "Phase Error" to the operator. When conditions are fulfilled, relay 8B is energized which closes its normally-open contacts, energizing another relay 10B. This relay's operation is explained below. The multi-function relay 8 also implements an adjustable over-voltage threshold function. When incoming voltage levels are below the over-voltage threshold, the other internal relay 8A energizes. When incoming voltage levels are above over-voltage threshold, the other internal relay 8A de-energizes internal relay SA. When in the over-voltage condition, this internal relay's 8A normally-closed contacts connect power to three (3) additional circuit relays, circuit relay 9, circuit relay 10A, and circuit relay 10B. Their functionality is described below.

The circuit contains transformer 6 that provides low-voltage power to cryopumps, in the range of 24-28 VAC single-phase with a center tap. This transformer has a single primary coil and two (2) sets of output taps, providing two (2) output voltage levels. This transformer's turns ratio is selected for two (2) specific incoming voltage ranges. For example, in the US common three-phase industrial power voltages are 208 and 240 VAC. When operating on 208 VAC, one secondary pair of windings provides ~26 VAC. Whereas when operating on 240 VAC, the other secondary pair of winding provides ~26 VAC. The low-voltage select relay 9 selects which of these pairs connect through the relay continuing through the circuit. This low-voltage select relay 9 is energized/de-energized via another circuit relay 8 contacts, whose operation was explained above.

Cryopumps are commonly offered with two (2) motor types: two-phase or three-phase AC options. The two-phase motors require a lead/lag of ninety (90) degrees, whereas the three-phase motors require a 120 degree phase angle between phases. A phase angle select switch 5 alters the primary winding connections of two (2) transformers 7 to incoming power. In one position, this 3PDT switch 5 connects these two (2) transformers 7 in a Scott-T configuration producing two phase ninety (90) degree phase angle output power. In the other switch 5 position, these two (2) transformers 7 primary windings are connected for a three phase output 120 phase angle. The combination of the phase selection switch 5 and these two (2) transformers 7 can provide either two phase or three phase output but not both simultaneously. These transformers 7 also have two (2) pairs of output windings, similar to the low-voltage transformer 6. The high-voltage select relay 10A selects between pairs of output windings. The multi-function relay 8 internal over-voltage relay 8A contacts energize the high-voltage select relay 10A to make the secondary winding selection. Again using the common US industrial voltages of 208 and 240 VAC, the combination of multi-function relay 8, the high-voltage select relay 10A, the two (2) transformers 7 and the phase select switch 5 provide the cryopump motor ~160 VAC in either two or three phase configuration. The voltage selection is automatic, whereas the manual phase selection is based on the cryopump power requirement.

With the proper voltage level and phasing, the cryopump motor power leaves the high-voltage select relay 10A onto the incoming voltage above low-voltage threshold relay 10B. The multi-function relay 8, explained above, energizes this relay 10B only if incoming facility power has correct phase orientation and is above the low-voltage threshold. When energized, this cryopump power continues on to the compressor permissive relay 10C.

Cryopump operation requires compressed cryogas coolant. Some cryogas compressors provide a relay contact closure 17 to signal functional operation to the facility or the process tool. When closed (compressor functioning correctly), these contacts energize the compressor permissive relay 10C which permits the proper cryopump motor voltage to continue through the circuit. If the cryogas compressor is not running or running in error, compressor permissive relay 10C is not energized, disconnecting power from the cryopump motors.

When the following conditions are fulfilled, incoming voltage is above a minimum threshold, the incoming phase angle is correct and the cryogas compressor is functional and operating, the proper cryopump motor voltage arrives at three terminal blocks 12. This pump power then passes through two circuit breakers 14 then onto the rear-panel cryopump power connectors 15. Simple cryopumps require only motor power; these are connected to the three (3) lower connectors 15. So-called "smart cryopumps" require motor power, low-voltage power and regenerative heater power. These smart cryopumps are connected the upper set of rear-panel connectors 15.

The PSE contains one additional functionality, a front-panel return cryogas pressure indicator. The indicator used here is an analog panel meter capable of continuous display of return pressure peaks and valleys. Operators can easily view this return pressure to check on their cryopump operation. The analog meter, the meter driver circuit and the return pressure sensor 16 are shown in FIG. 5.

The cryogas compressor 18 typically houses two (2) circuit components, the compressor permissive relay contact closure 17 and the return pressure sensor 16. If a vendor's cryogas compressor design doesn't contain or provide access to these components, other approaches exist to provide this functionality. Embodiments of the Transformer PSE shown may operate with most standard, worldwide industrial voltages, including standard 200, 208, 220, 230, 240, 346, 347, 380, 400, 415 and 480 VAC.

Universal Controller Power Sunply Element: AC-AC Converter-Based

The transformer-based PSE in the previous section, while functional, has some limitations: transformers are physically large, heavy and expensive, output voltage level is susceptible to line voltage fluctuations, additional primary or secondary taps with a more complicated automatic tap selection circuit to keep design automatic when required to accept a wider voltage range input, inability to simultaneously power two and three phase pumps, and the inability to function with single phase incoming power.

Figure 6:
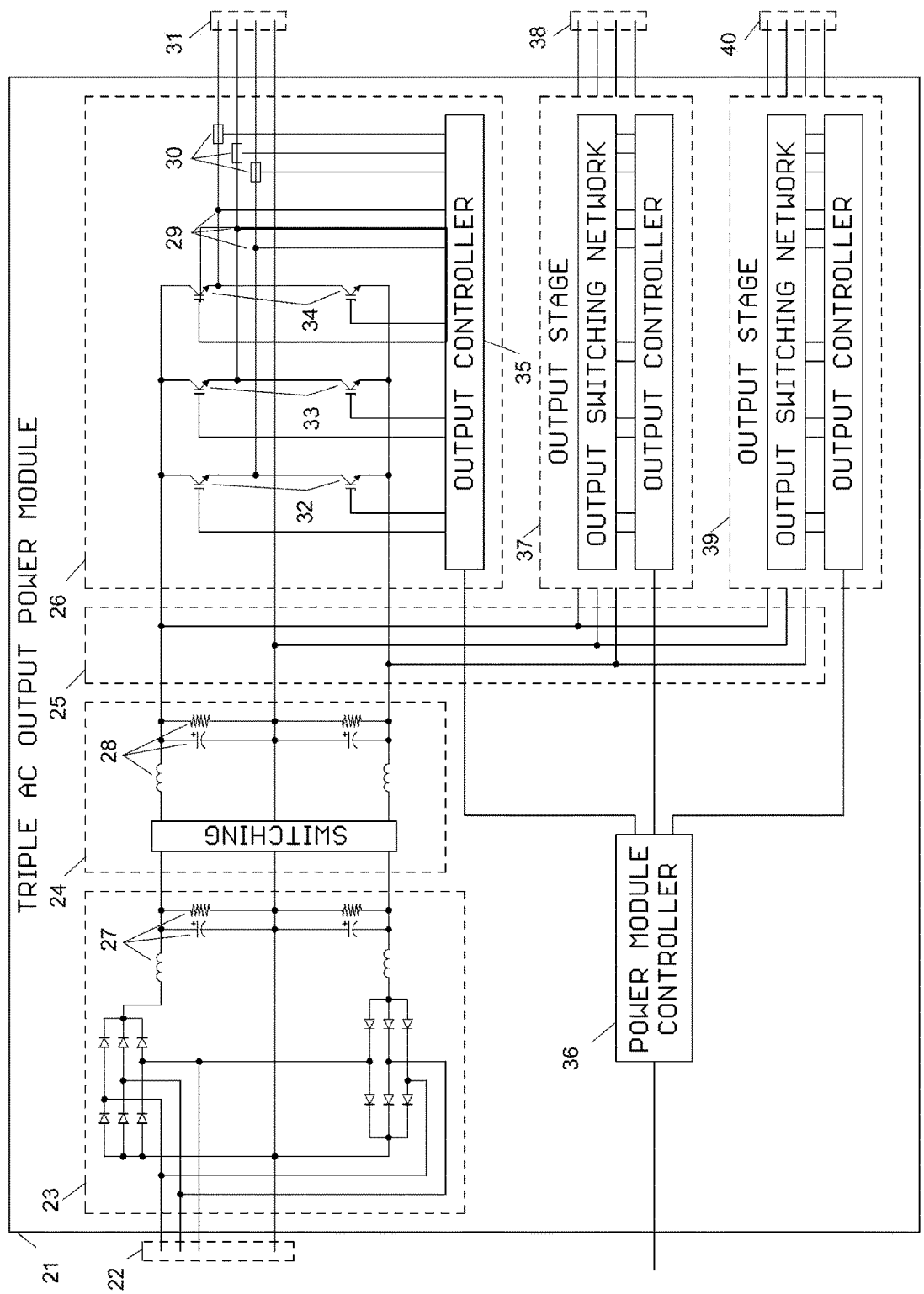
FIG. 6 is a schematic drawing of an embodiment of a Universal Controller Power Supply Element (PSE) with a pseudo transformer-less triple AC output power module.

Replacing these voltage and phase converting transformers with an AC to AC converter overcomes these limitations. FIG. 6 shows the pseudo circuit schematic for this converter 21. This design accepts a wider range of input voltages and frequencies (50 or 60 Hz), 200 VAC to 480 VAC both single and three phase power. The PSE embodiment shown replaces the bulky and expensive transformers with modern high-frequency switching circuits. Output voltage level is independent from input voltage level.

FIG. 6 illustrates a pseudo transformer-less triple AC output power module. Incoming single- or three-phase facility power 22 terminates at the power module input stage 23. The input stage contains two three-phase full wave rectifiers, each with a filter network 27. These rectifiers and filter networks produce the first intermediate bi-polar (plus and minus) DC voltages (the specific voltage level is unimportant). A DC/DC buck-boost stage 24 converts the first intermediate DC voltages to a secondary DC voltage level 25. This secondary intermediate DC voltage powers three (3) AC inverter output stages, AC inverter output stage 26, AC inverter output stage 37, and AC inverter output stage 39.

The individual output stages invert the secondary intermediate DC voltage 25 to a unique set of voltages, frequencies and phasing depending on requirements of each output (output 31, output 38, and output 40). For example, a cryopump heater requires single phase 208V, whereas its motor requires 160V two phase with center tap at ninety-degree phase shift. Output stage 26 shows more detail. Output stage 17 and output stage 19 are replicas of output stage 26.

An output stage accepts the bi-polar secondary DC voltage and contains three (3) half-bridge transistor arrays, array 32, array 33, and array 34, shown here as insulated-gate bipolar transistors, IGBT. The type actually used, BJT, NMOS, or IGBT, is not important for this discussion. The three (3) half-bridge arrays are driven by the output controller 35. This dedicated microprocessor produces a synchronized set of high-frequency switching signals. These switching signals with the half-bridge arrays, array 32, array 33, and array 34, create an AC output using a technique called pulse-width modulation, PWM. Using PWM, the output controller coupled to the half-bridges can produce 3 output AC waveforms at any voltage level up to the second intermediate DC voltage level 25, with any waveshape and any phasing. For cryopump operation, the output stage needs to produce an AC sine wave at a specific frequency with a specific phase shift.

Figure 4A:
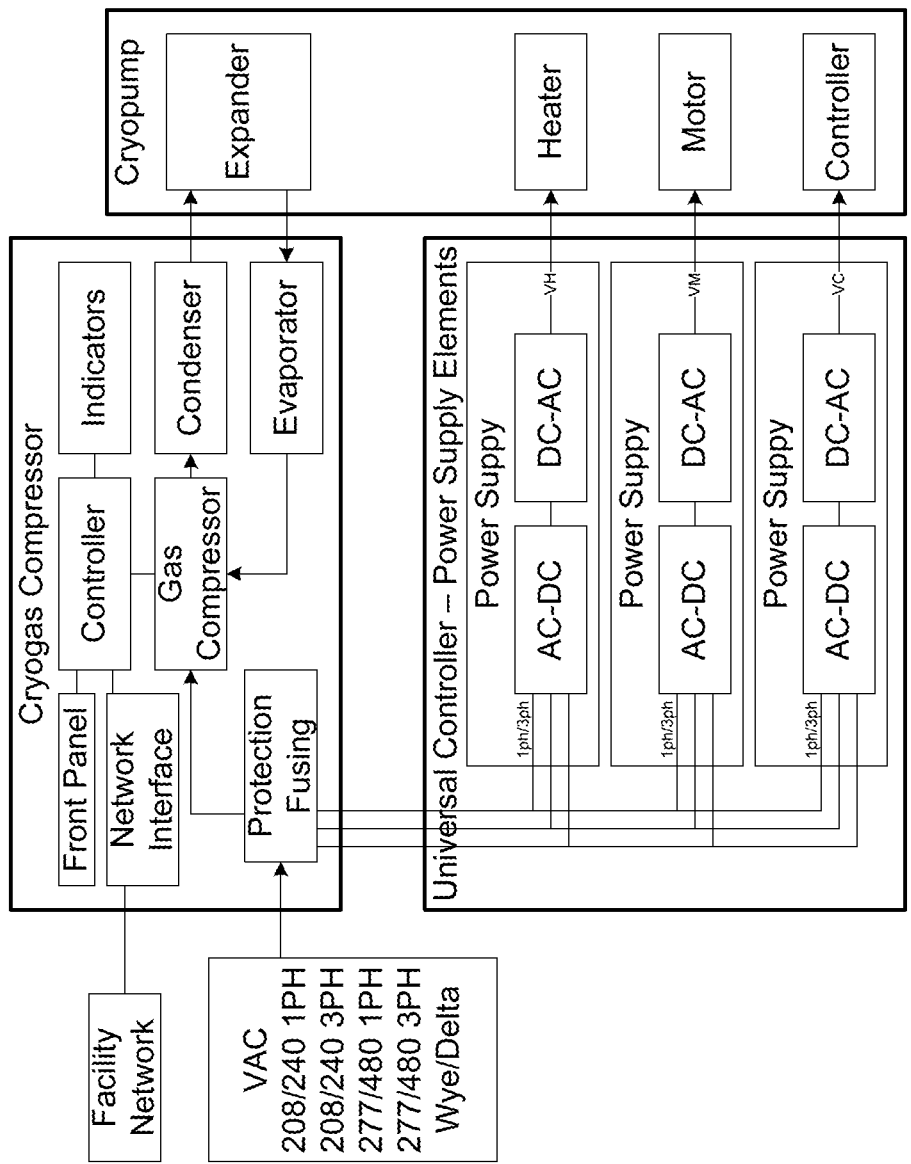
FIG. 4A is a schematic diagram of a host cryogas compressor using Universal Controller Power Supply Element (PSE) providing a triple output switching/inverter power supply capable of independently providing the correct voltage, current, and phase to the cryopump. This arrangement accepts additional facility power including single phase and 3-phase power ranging from 208 to 480 volts.
Figure 4B:
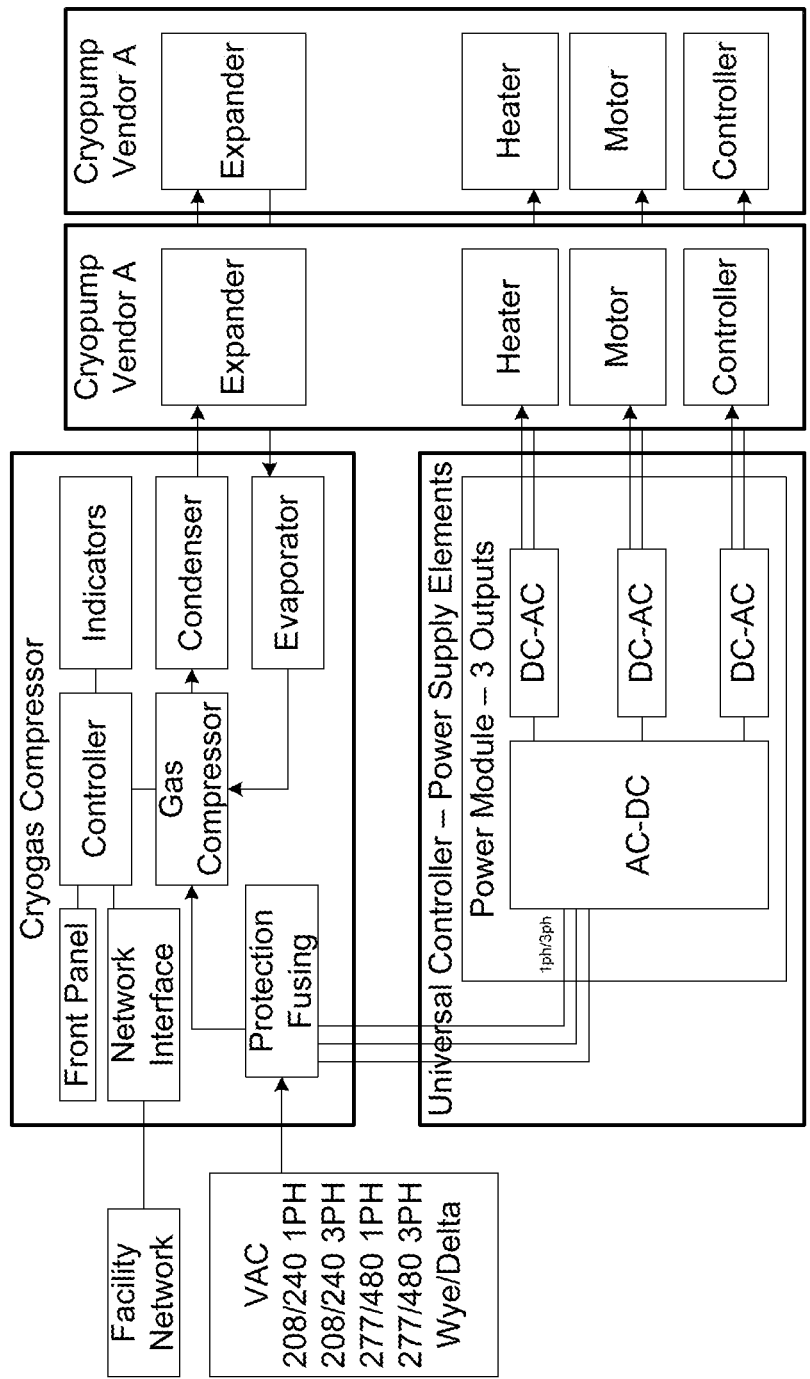
FIG. 4B is a schematic diagram of host compressor and a cost-reduction step in a Universal Controller Power Supply Element (PSE) configuration that replaces three individual power supplies in a Universal Controller Power Supply Element (PSE) design with an independent AC output power module.
Figure 4C:
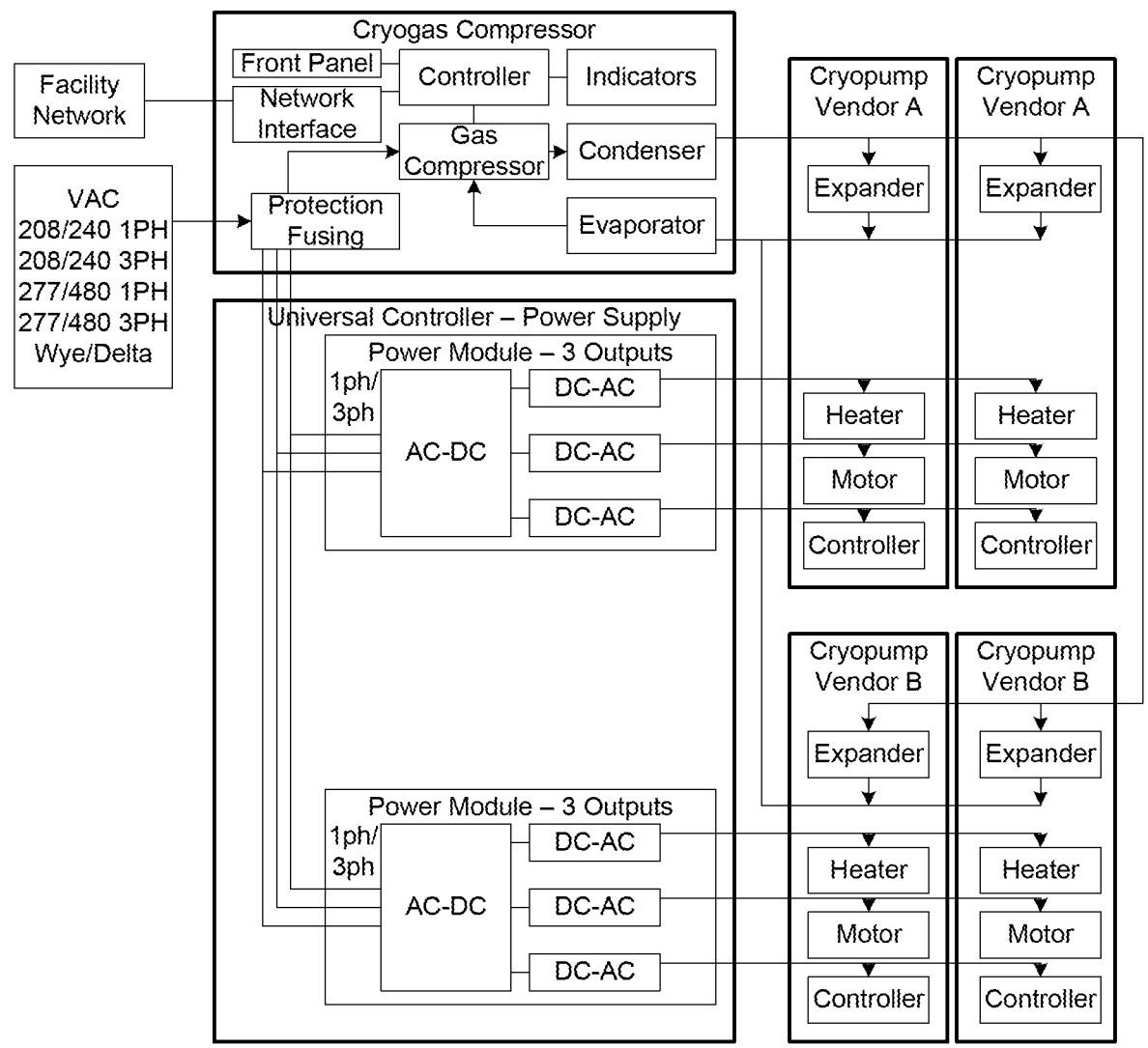
FIG. 4C is a schematic diagram of a host compressor with a Universal Controller Power Supply Element (PSE) configuration that provides multiple power modules, one per each vendor's cryopumps.

As seen in FIG. 6, the output controller accepts two forms of feedback; voltage-level feedback 29 and current-level feedback 30. The output controller loop requires this feedback to optimize half-bridge control, thus efficiency. This feedback also permits extensive load characterization. Examples of characteristics include: motor bearing degradation resulting in increased current consumption, natural resonance avoidance through voltage level or phase shift variance, fault condition detection and cryopump operation abnormalities through back EMF analysis. The operating conditions, optimization parameters, fault detection and abnormality analysis data is passed to the power module controller 36, which aggregates this information from three output stages and issues reports to the universal cryogas compressor controller shown in FIG. 4b.

The Universal Controller PSE DC to AC output stages, output stage 26, output stage 37, and output stage 39, contain an additional feature, the presence of ground. Each AC output contains three (3) ground referenced voltages, voltage 31, voltage 38, and voltage 40, having a phase relationship to each other and their voltage-level output. This means the individual AC voltages have both a positive and a negative voltage excursion referenced to ground. This feature permits flexible operation of single-phase motors, three-phase motors, three-wire two-phase motors with common, devices requiring single phase AC with a center tap, etc.

As stated above, output stage 37 and output stage 39 with their half-bridge switching networks and output controllers produce a unique set of output AC waveforms, each with different voltage and phasing, to match the load requirements. The power module controller 36 collects, aggregates and issues reports containing runtime statistics, analysis and parameters to the Universal Controller.

The AC-AC PSE, while more complex, offers enhanced functionality over the transformer-based design as outlined above. In addition, it will be smaller and lighter, permitting more interoperability options such as increased output module count in the same physical volume. Its flexibility and analysis capabilities extend the Universal Controller's PSE and PTE use beyond the cryogas compression industry. The Universal Controller PSE and PTE can be deployed into any industry that requires single, two or three phase power. Embodiments of the AC-AC PSE may operate with all or substantially all standard, worldwide voltages, including standard 100, 110, 120, 127, 200, 208, 220, 230, 240, 346, 347, 380, 400, 415 and 480 VAC.

Embodiments of the PSE, including the embodiments described above with regards to FIGS. 5 and 6, may provide power outputs supporting a range of cryogenic devices from various manufacturers. Cryogenic devices, including cryopumps, from manufacturers may have varying power requirements. The table below lists sample power requirements for various manufacturers' cryopumps. These power requirements are listed herein simply as an example of the various power requirements that embodiments of the PSE may supports, not as definitive list of the power requirements or cryogenic devices that the PSE supports.

| Volt. AC | Freq. (Hz) | Phase | Manufacturers |
| --- | --- | --- | --- |
| 150 | 50/60 | 2/3 | Austin Scientific/Brooks/CTI/Helix Technology/Oxford/Trillium/Ulvac/ |
| 155 | 50/60 | 2/3 | Austin Scientific/Brooks/CTI/Helix Technology/Oxford/Trillium/Ulvac/ |
| 160 | 50/60 | 2/3 | Austin Scientific/Brooks/CTI/Helix Technology/Oxford/Trillium/Ulvac/ |
| 200 | 50/60 | 2/3 | Balzers/CVI/Ebara/Genesis/HSR/PHPK/Sumitomo/Varian |
| 208 | 50/60 | 2/3 | Balzers/CVI/Ebara/Genesis/HSR/PHPK/Sumitomo/Varian |
| 220 | 50/60 | 2/3 | Balzers/CVI/Ebara/Genesis/HSR/PHPK/Sumitomo/Varian |
| 240 | 50/60 | 2/3 | Balzers/CVI/Ebara/Genesis/HSR/PHPK/Sumitomo/Varian |
| 240 | 50/60 | 1 | Leybold |
| 240 | 50/60 | 1 | Sumitomo |

Figure 1I:
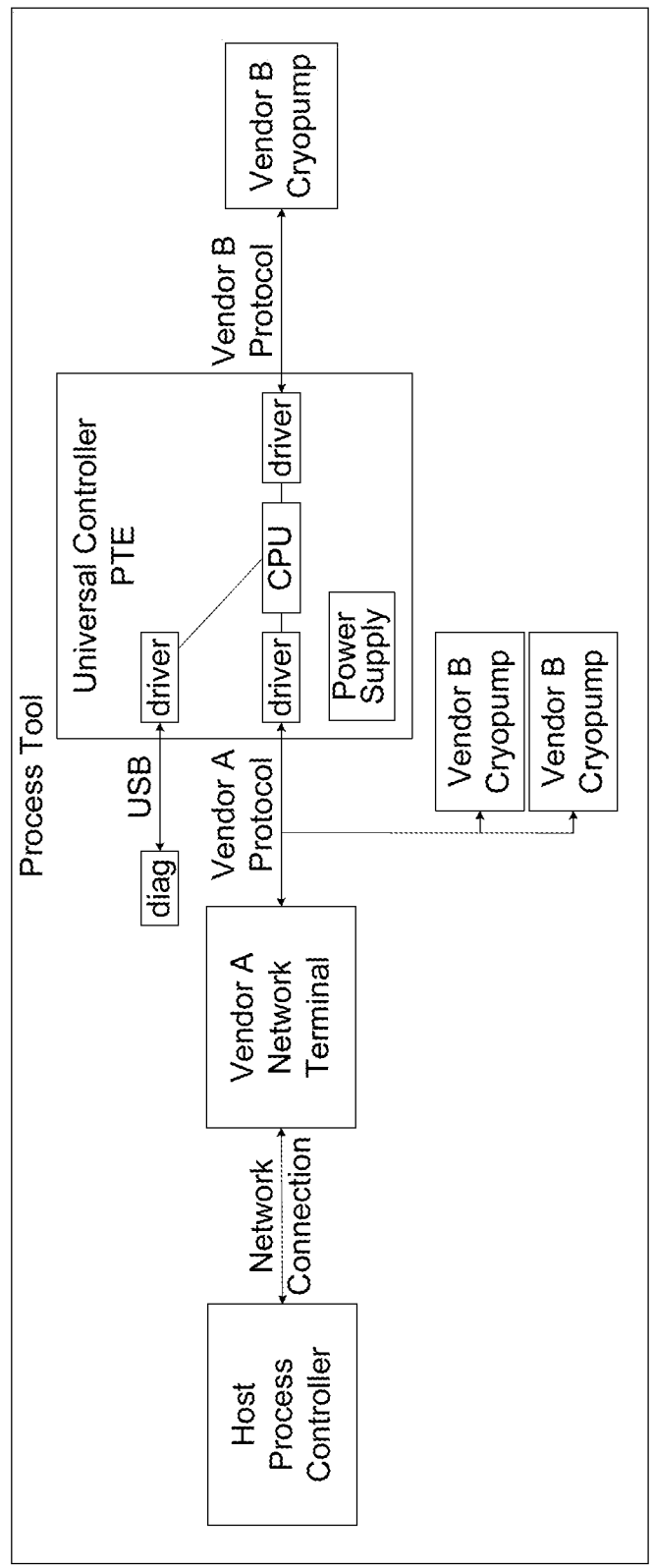
FIG. 1I is a schematic diagram of the Protocol Translator integrated into Vendor B's cryopump controller thus enabling communication with Vendor A's Network terminal and the Process Tool Controller.

Universal Controller Protocol Translator:

The protocol translator may be implemented as software within a controller as shown in FIG. 1I. Herein, the protocol running the second vendor's equipment is referred to as the "target protocol" and the second vendor's equipment as the "target equipment" and the protocol running the first vendor's equipment is the "origination protocol" and the first vendor's equipment as the "origination equipment."

For example, the target protocol may be IEEE-1118 also known as Bitbus or IEC 61158 also known as Fieldbus. Both formats were developed more than 20 years ago and have undergone iterations. Certain older cryopump and/or cryogas compressors use older versions that are flashed on IC chips. Since the BITBUS integrated circuit chips are no longer readily available, one skilled in the art would have to find a compiler and a suitable (usually vintage) computer to recompile Bitbus. Moreover, the target protocol and the origination protocol may use different communication speeds.

However, the protocol translator uses a driver called a bit-banging serial driver that emulates the target protocol such as Bitbus. The protocol translator receives and sends target protocol packets, such as BITBUS packets and translates the communication speed differences. The communication speed differences may be resolved by sending repeated null-headers and/or frames from the protocol translator to the target equipment and or to the origination equipment. Therein, software decoding of BITBUS stream is a high-performance CPU task. Software-only BITBUS runs at 375 kps that requires a fast processor to timely handle interrupts, such as an ARM cortex processor running at 72 Mhz or an ARM processor at 168 MHz, with improved interrupt performance.

The protocol translator may be implemented as hardware. Specifically, the protocol translator may be a field-programmable gate array (FPGA) or other integrated circuit configurable at any time. The FPGA implements the Synchronous Data Link Control (SDLC) computer communications protocol in hardware (for example, D85C30—Universal asynchronous receiver-transmitter (UART) Core with SDLC Function) or a pre-existing SDLC hardware transceiver like the Zilog Z85C30. These hardware solutions are more readily available than specific Intel chipsets used in target equipment from more than 20 years ago.

Using FGPA/Transceiver hardware solution for the SDLC protocol signaling task, the target protocol commands are sent over BITBUS. The FPGA is not limited to a single protocol, such as BITBUS mentioned here. The FPGA's programmable nature enables other protocol implementations for a specific application or multiple applications simultaneously. Protocols such as CAN, DeviceNET, HART, MODBUS (Modbus ASCII, Modbus RTU, Modbus, TCP), Profibus, ControlNet, UDP, TCP, HTTP, SNMP, JSON, WebSockets, MQTT, COAP, SPP, GAP, GATT, etc. over different physical layers, RS-232, RS-422/485, Ethernet, WiFi, Bluetooth (Bluetooth Classic, Bluetooth Smart), USBetc. can be deployed within the Universal Controller PTE.

Figure 9:
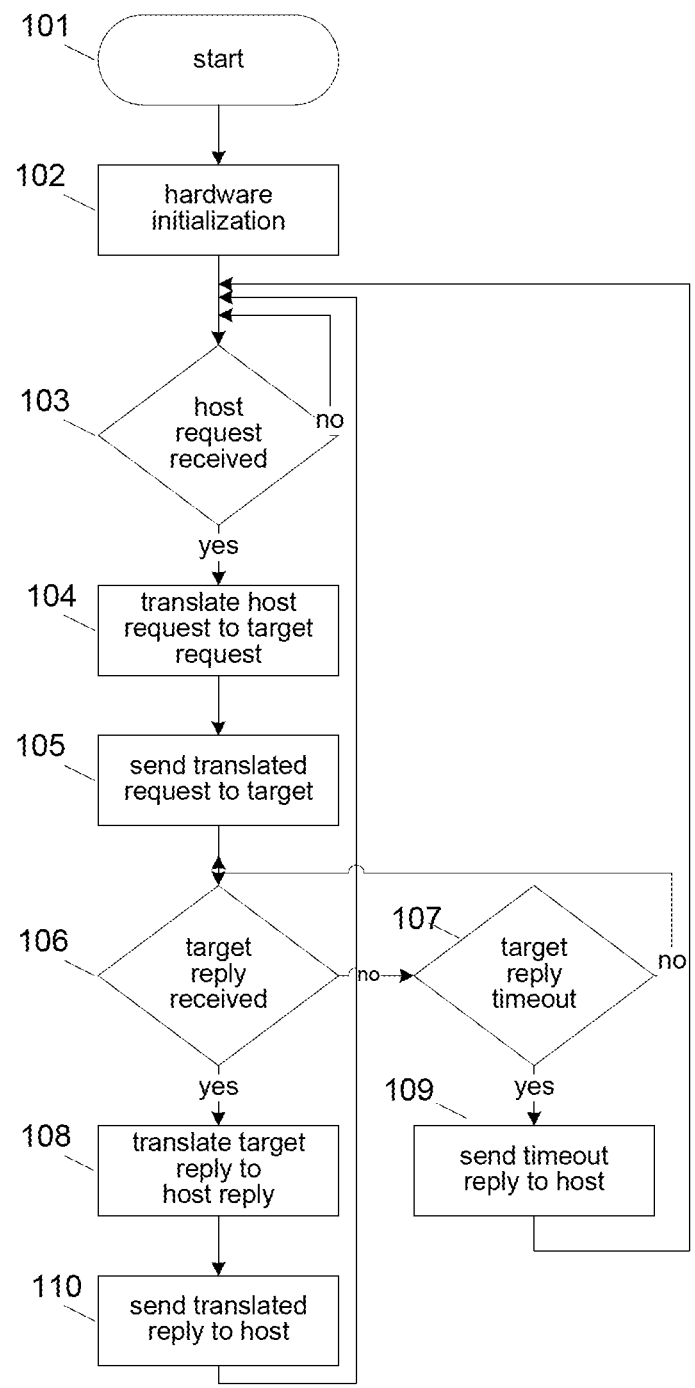
FIG. 9 is a flowchart illustrating the operation of an embodiment of a Universal Controller Protocol Translator Element (PTE).

A simplified protocol translation flowchart is shown in FIG. 9. The process starts 101 and proceeds to initialization 102. During initialization 102, internal process variables are initialized, hardware registers are configured and enabled. The flow then moves onto a wait loop 103, where the process awaits the arrival of an incoming host data packet in the host's protocol. If a packet is not received, this step continues to wait. When a packet does arrive, this packet flows onto the next step, translation 104. The translation 104 extracts relevant data then uses a rule set to convert this host data into a target request in the target's protocol. Rules consist of command, format, unit, etc. Translation 104 is similar to human language translation. For example, translating a phrase English to French might involve different nouns, verbs, a unit conversion and/or date conversion with format change. Industrial protocol conversion is similar to natural language conversion. Translation 104 creates a translated target packet and passes it to the next step, sending translated the packet to a target 105. The process then continues onto the target reply wait loop 106. The target reply wait loop 106 incorporates a reply timeout check 107. The target may not reply for several reasons: protocol translation error, target is busy, target not available, system configuration issue, etc. When if the timeout check 107 expires, the process continues onto sending a timeout message to a host 109. However, if the target replies before this timeout check 107 expires, the target reply packet is passed to another flow step, target to host translation 108. Target to host translation 108 applies the rules mentioned above in reverse, where the target packet data is translated back to the host protocol. This back translated target packet is then passed to final step, sending translated reply 110. When transmission completes, the entire process starts again by waiting for host protocol packet arrival 103. The translation process outlined here functions in request-reply protocols, where a single entity, the host, communicates by sending requests and awaiting their replies. Scenarios arise where host protocols expect target reply within a specific time window. The time required for forward packet translation, transmission of the translated packet, target processing, reply transmission, back translation, transmission of the host protocol packet may exceed the host protocol time window. If this is case, several remediation options may exist: increasing the host protocol reply time window through host configuration, increasing the target communication speed, or implementing a caching mechanism within the translation process where the host request replies are pulled from cache instead of through target communication. The cache approach requires another process to maintain this cache.

Figure 10:
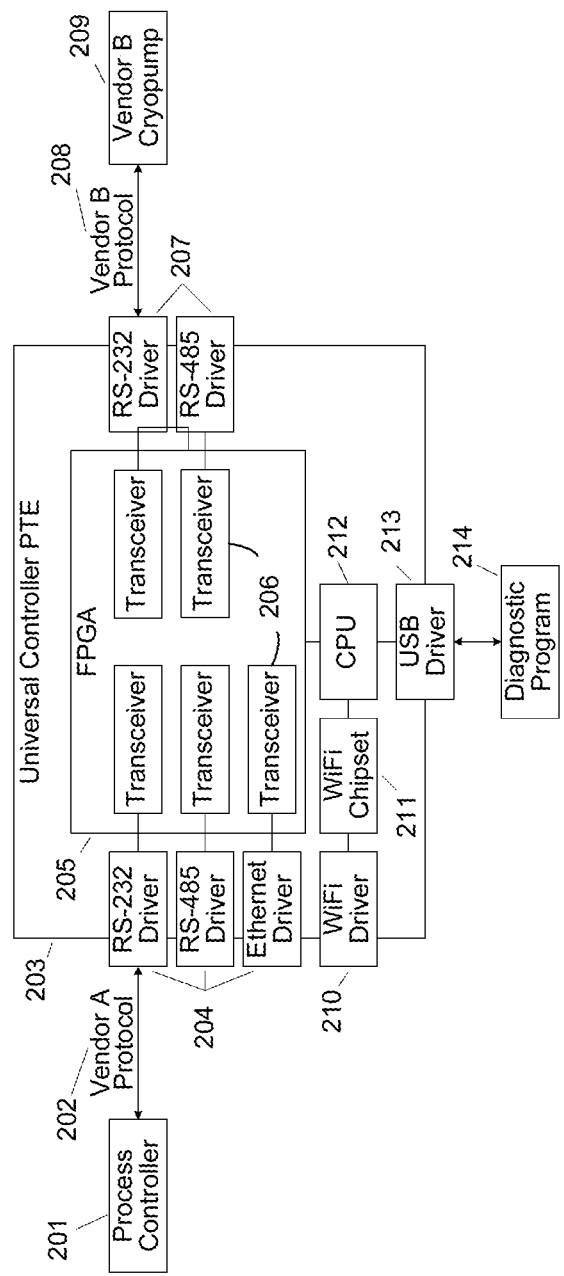
FIG. 10 is a block diagram illustrating hardware and software components of an embodiment of a Universal Controller Protocol Translator Element (PTE).

With reference now to FIG. 10, shown is block diagram illustrating an embodiment of a protocol translator element (PTE) with major hardware components. Also shown are the host process controller 201, the host protocol 202, the target cryopump 209, the target protocol 208 and the operator diagnostic program. The overall design consists of various communication media drivers, including media driver 204, media driver 207, media driver 210, and media driver 213, a FPGA 205, a wireless communication option 211 and a CPU 212. Multiple media drivers implement various common industrial physical layers. Fiber media is an option but is not shown here. The FPGA implements multiple transceivers 206 through its generalized gate array fabric. These independent transceivers simultaneously operate in a parallel fashion. A high-speed interconnect exists between the FPGA and the PTE CPU 212. Configuration and packet translation are the CPU's responsibility. The operator executes an external configuration/diagnostic program 214 to alter the PTE configuration or run diagnostics.

Embodiments of the inventions described herein may include numerous variations and combinations of elements described herein. For example, the power supply element (PSE) may provide "n" power supply outputs, where n is limited only by the physical size of the PSE and the housing containing the PSE, the hardware for each power supply output, and the physical space of the housing given over for the PSE. For example, embodiments may include three (3), four (4), five (5) or more power supply outputs. The phase angle of the outputs may have any phase angle, including ninety (90), one-hundred twenty (120) or an arbitrary degree phase angle. Additionally, while the power supply outputs may provide difference outputs of different voltages, frequency, phase, and phase angle, multiple power supply outputs may provide the same output or outputs with common voltages, frequencies, phases, and/or phase angles. Likewise, while cryo devices driven by the PSE may have different power supply requirements, such cryo devices may communicate with the same or different communication protocols. If communicating with the same communication protocol, the PTE is not needed for such cryo devices. Likewise, cryo devices driven by the PSE may have the same power supply requirements but communicate with the same or different communication protocols. The embodiments of the universal controller, PSE and PTE may be configured for any of these variations and different combinations thereof. Moreover, the PSE may be or may include a programmable power supply output that is configurable to provide power supply outputs of a plurality of combinations of voltage, phase, and phase-angle degrees. Additionally, as shown above, the PSE and/or the PTE may be integrated into the universal controller or may be separate, stand-alone units. The PSE may be in a separate, independent housing attached to a cryo compressor, or other cryogenic system element, and the PTE may be embedded in a separate controller. Consequently, the PSE and/or the PTE may have their own independent power supplies. These variations and others are supported and may be provided according to the embodiments described herein.

SUMMARY

While cryogas compressors are reliable, their long life poses an operational risk on facility management. The longer a compressor is in service the more likely are higher maintenance costs and decreases in drop-in OEM replacement availability as models are deemed legacy products and phased out of production and support. An unserviceable compressor with no replacement availability can create an interoperability constraint that requires purchasing not only a new replacement compressor but also the associated cryogenic pump equipment and accessories because new OEM equipment is frequently not backward compatible with legacy equipment. Without a capital budget, or on a low-margin process, this interoperability constraint forces aging facilities to seek third party options including refurbished used equipment purchases, often carrying little or no warranty. These purchases themselves involve risk and near-future process down time.

The Universal Controller comprised of its Power Supply Element and its Protocol Translator, solves the interoperability constraint by supplying aging facilities with a new drop-in replacement cryogas compressor purchasing option and alternative cryopump drop in replacement options. The ability to access these equipment resources from alternate manufacturers lowers customer's risk of process down time. New efficient compressor technologies offer more compression performance in the same physical foot print as aging legacy products and offer lower operating costs. The Universal Controller, deploying the Power Supply Element separately, deploying its Protocol Translator separately, or deploying both the PSE and the PTE in parallel, provides total flexibility for an end user to choose drop-in replacement compressors separately, or drop-in cryopumps separately, or both compressors and cryopumps while also integrating into an existing communications network.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A universal controller configured to drive and communicate with a plurality of cryogenic devices, in a cryogenic system, that have different power supply requirements and use different, incompatible communication protocols, comprising:

a power source that provides an input voltage that has a standard phase and frequency;

a power supply element, connected to the power source, that is configured to simultaneously drive the plurality of cryogenic devices, the power supply element including:

a plurality of power supply outputs each with a phase, the plurality of power supply outputs including:

a first power supply output that provides a first output voltage at a first phase to a first type of cryogenic device that has first power requirements; and a second power supply output that provides a second output voltage at a second phase to a second type of cryogenic device that has second power requirements, wherein the second output voltage is different than the first output voltage, the second phase is different than the first phase, and the second power supply requirements are different than the first power supply requirements; and a protocol translator element, connected to the power source, that is configured to enable communication between the plurality of cryogenic devices, the protocol translator element including:

a plurality of communication input/outputs that receive and transmit cryogenic device communications in a plurality of protocols; and a processor, communicatively connected to the plurality of communication input/outputs, that receives, translates, and outputs cryogenic device communications into different, compatible communication protocols, wherein the processor is configured to:

receive and transmit communications from and to the first type of cryogenic device, wherein the communications from and to the first type of cryogenic device are in a first cryogenic device communication protocol; and receive and transmit communications from and to the second type of cryogenic device, wherein the communications from and to the second type of cryogenic device are in a second cryogenic device communication protocol that is different from the first cryogenic device communication protocol;

wherein the processor translates communications sent by the first type of cryogenic device from the first cryogenic device communication protocol into the second cryogenic device communication protocol and translates communications sent by the second type of cryogenic device from the second cryogenic device communication protocol into the first cryogenic device communication protocol, enabling the first type of cryogenic device and the second type of cryogenic device to communicate with each other.

2. The universal controller of claim 1 wherein the power source is a single universal controller power source the that provides power for the entire universal controller.

3. The universal controller of claim 1 wherein the power source includes an independent power source dedicated to the power supply element and an independent power source dedicated to the protocol translator element.

4. The universal controller of claim 1 wherein the first power supply output is one or more selected from a group consisting of a two-phase power supply output with a ninety-degree phase angle, a three-phase power supply output, a single-phase power supply output, and combinations thereof.

5. The universal controller of claim 1 wherein the first power requirements include a required voltage, a required current, and a required phase.

6. The universal controller of claim 1 wherein the plurality of power supply outputs further includes a third power supply output that provides a third output voltage at a third phase to a third type of cryogenic device that has third power supply requirements, and the third output voltage, the third phase and the third power supply requirements meet following conditions:
wherein the third output voltage is different than the first and second output voltages, the third phase is different than the first and second phase phases, and the third power supply requirements are different than the first and second power supply requirements;
wherein the third output voltage is different than the first output voltage, the third phase is different than the first phase, and the third power supply requirements are different than the first power supply requirements;
wherein the third output voltage is different than the first output voltage and is the same as the second output voltage, the third phase is different than the first phase and is the same as the second phase, and the third power supply requirements are different than the first power supply requirements and are the same as the second power supply requirements; or
wherein third power supply requirements are different than the first power supply requirements and communications from and to the third type of cryogenic device are in the first cryogenic device communication protocol.

7. The universal controller of claim 1 wherein the first type of cryogenic device and second type of cryogenic device are manufactured by different vendors.

8. The universal controller of claim 1 wherein at least one of the first type of cryogenic device and the second type of cryogenic device is a cryopump, wherein the first type of cryogenic device is a cryopump and the second type of cryogenic device is a compressor, wherein at least one of the first type of cryogenic device and the second type of cryogenic device is an expander, or wherein at least one of the first type of cryogenic device and the second type of cryogenic device is a cryocooler.

9. The universal controller of claim 1 further comprising a network connection enabling remote, external monitoring of universal controller operational status.

10. The universal controller of claim 1 further comprising a housing that contains the power supply element and the protocol translator element.

11. The universal controller of claim 1 further comprising a first housing that contains the power supply element and a second housing that contains the protocol translator element.

12. The universal controller of claim 1 wherein the processor is further configured to receive and transmit communications from and to a third type of cryogenic device, wherein the communications from and to the third type of cryogenic device are in a third cryogenic device communication protocol that is different from the first and second cryogenic device communication protocols.

13. The universal controller of claim 1 wherein the power supply element includes a programable power supply output that is configurable to provide power supply outputs of a plurality of combinations of voltage, phase, and phase-angle degrees.

14. A method of driving and communicating with a plurality of cryogenic devices, in a cryogenic system, that have different power supply requirements and use different, incompatible communication protocols, comprising:
receiving an input voltage, wherein the input voltage has a phase and frequency;
simultaneously driving the plurality of cryogenic devices, wherein the simultaneously driving includes:
outputting a first output voltage at a first phase to a first type of cryogenic device that has first power supply requirements; and
outputting a second output voltage at a second phase to a second type of cryogenic device that has second power supply requirements, wherein the second output voltage is different than the first output voltage, the second phase is different than the first phase, and the second power supply requirements are different than first power supply requirements; and
enabling communication between the plurality of cryogenic devices, wherein the enabling includes:
receiving communications from the first type of cryogenic device, wherein the communications from the first type of cryogenic device are in a first cryogenic device communication protocol;
receiving communications from the second type of cryogenic device, wherein the communications from the second type of cryogenic device are in a second cryogenic device communication protocol that is different from the first cryogenic device communication protocol;
translating communications received from the first type of cryogenic device from the first cryogenic device communication protocol into the second cryogenic device communication protocol; and
transmitting the translated communications received from the first type of cryogenic device to the second type of cryogenic device, wherein the translated communications from the first type of cryogenic device are in the second cryogenic device communications protocol.

15. The method of claim 14 wherein the enabling communication further includes:
translating communications received from the second type of cryogenic device from the second cryogenic device communication protocol into the first cryogenic device communication protocol; and
transmitting the translated communications received from the second type of cryogenic device to the first type of cryogenic device, wherein the translated communications from the second type of cryogenic device are in the first cryogenic device communications protocol.

16. The method of claim 14 wherein the first output voltage is a two-phase output.

17. The method of claim 14 wherein the simultaneously driving includes outputting a third output voltage wherein the third output voltage is a three-phase output.

18. The method of claim 14 wherein the simultaneously driving includes outputting a third output voltage at a third phase to a third type of cryogenic device that has third power supply requirements, wherein the third output voltage is different than the first and second output voltages, the third phase is different than the first and second phase, and the third power supply requirements are different than the first and second power supply requirements.

19. The method of claim 14 wherein the simultaneously driving includes outputting a third output voltage at a third phase to a third type of cryogenic device that has third power supply requirements, wherein the third output voltage is different than the first output voltage, the third phase is different than the first phase, and the third power supply requirements are different than the first power supply requirements.

20. The method of claim 14 wherein the simultaneously driving includes outputting a third output voltage at a third phase to a third type of cryogenic device that has third power supply requirements, and wherein the third output voltage is the same as the second output voltage, the third phase is the same as the second phase, and the third power supply requirements are the same as the second power supply requirements.

21. The method of claim 14 wherein at least one of the first type of cryogenic device and the second type of cryogenic device are chosen from a list consisting of: a cryopump, an expander, and a cryocooler, or wherein the first type of cryogenic device is a cryopump and the second type of cryogenic device is a compressor.

22. A universal controller configured to drive and communicate with a plurality of cryogenic devices, in a cryogenic system, that have different power supply requirements and use different, incompatible communication protocols, comprising:
    a power source that provides an input voltage that has a phase and frequency;
    a power supply element, connected to the power source, that is configured to simultaneously drive the plurality of cryogenic devices, the power supply element including:
        a plurality of power supply outputs each with a phase, the plurality of power supply outputs including:
        a first power supply output that provides a first output voltage at a first phase to a first type of cryogenic device that has first power requirements; and
        a second power supply output that provides a second output voltage at a second phase to a second type of cryogenic device that has second power requirements; and
    a protocol translator element, connected to the power source, that is configured to enable communication between the plurality of cryogenic devices, the protocol translator element including:
        a plurality of communication input/outputs that receive and transmit cryogenic device communications in a plurality of protocols; and
        a processor, communicatively connected to the plurality of communication input/outputs, that receives, translates, and outputs cryogenic device communications into different, compatible communication protocols, wherein the processor is configured to:
            receive and transmit communications from and to the first type of cryogenic device, wherein the communications from and to the first type of cryogenic device are in a first cryogenic device communication protocol; and
            receive and transmit communications from and to the second type of cryogenic device, wherein the communications from and to the second type of cryogenic device are in a second cryogenic device communication protocol that is different from the first cryogenic device communication protocol;
        wherein the processor translates communications sent by the first type of cryogenic device from the first cryogenic device communication protocol into the second cryogenic device communication protocol and translates communications sent by the second type of cryogenic device from the second cryogenic device communication protocol into the first cryogenic device communication protocol, enabling the first type of cryogenic device and the second type of cryogenic device to communicate with each other.

23. The universal controller of claim 22 wherein the second power supply requirements are different than the first power supply requirements.

24. The universal controller of claim 22 wherein the second output voltage is different than the first output voltage.

25. The universal controller of claim 22 wherein the second phase is different than the first phase.

26. The universal controller of claim 22 wherein the second power supply requirements are the same as the first power supply requirements.

* * * * *